(12) United States Patent
Ohno

(10) Patent No.: US 11,954,884 B2
(45) Date of Patent: Apr. 9, 2024

(54) OPTICAL APPARATUS

(71) Applicant: KABUSHIKI KAISHA TOSHIBA, Tokyo (JP)

(72) Inventor: Hiroshi Ohno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 422 days.

(21) Appl. No.: 17/185,186

(22) Filed: Feb. 25, 2021

(65) Prior Publication Data

US 2022/0084240 A1  Mar. 17, 2022

(30) Foreign Application Priority Data

Sep. 16, 2020 (JP) ................................. 2020-155066

(51) Int. Cl.
*G06F 3/01* (2006.01)
*F21V 8/00* (2006.01)
(Continued)

(52) U.S. Cl.
CPC .............. *G06T 7/74* (2017.01); *G02B 6/0046* (2013.01); *G02B 6/0055* (2013.01); *G02B 27/4205* (2013.01); *G02F 1/133504* (2013.01); *G06T 7/521* (2017.01); *G06T 7/90* (2017.01); *H04N 23/56* (2023.01); *G02F 2203/01* (2013.01); *G02F 2203/055* (2013.01); *G06T 2200/28* (2013.01)

(58) Field of Classification Search
CPC .. G02B 6/0046; G02B 6/0055; G01B 9/0203; G06T 7/74; G06T 7/90; G02F 1/133504; G06B 17/4205
See application file for complete search history.

(56) References Cited

U.S. PATENT DOCUMENTS 5,675,407 A    10/1997  Geng
10,051,243 B2   8/2018  Kurashige et al.
(Continued)

FOREIGN PATENT DOCUMENTS

JP    2008-209726 A    9/2008
JP    2011-504230 A    2/2011
JP    2019-124542 A    7/2019

OTHER PUBLICATIONS

Howes, W. L., "Rainbow schlieren and its applications," Applied Optics, vol. 23, No. 14, pp. 2449-2460 (1984).
(Continued)

*Primary Examiner* — Phuoc H Doan
(74) *Attorney, Agent, or Firm* — Finnegan, Henderson, Farabow, Garrett & Dunner, LLP

(57) ABSTRACT

According to an embodiment, an optical apparatus includes an illumination unit, an imaging unit and a processing unit. The illumination unit emits a first ray having a first wavelength and a second ray having a second wavelength different from the first wavelength to an object. The imaging unit includes a first pixel which receives the first ray emitted to the object and a second pixel which receives the second ray emitted to the object to capture an image based on the first ray received by the first pixel and the second ray received by the second pixel. The processing unit calculates a first ray direction of the first ray and a second ray direction of the second ray based on the image captured by the imaging unit.

14 Claims, 10 Drawing Sheets

(51) Int. Cl.

| | |
|---|---|
| *G02B 27/42* | (2006.01) |
| *G02F 1/1335* | (2006.01) |
| *G06T 7/521* | (2017.01) |
| *G06T 7/73* | (2017.01) |
| *G06T 7/90* | (2017.01) |
| *H04N 23/56* | (2023.01) |

(56) References Cited

U.S. PATENT DOCUMENTS

| | | |
|---|---|---|
| 10,732,102 B2 | 8/2020 | Ohno et al. |
| 2010/0284589 A1 | 11/2010 | Thiel et al. |
| 2020/0408505 A1* | 12/2020 | Körner .............. G01B 9/02091 |

OTHER PUBLICATIONS

Kim, J. S et al., "Multiaperture telecentric lens for 3D reconstruction," Optics Letters, vol. 36, No. 7, pp. 1050-1052 (2011).

* cited by examiner

OPTICAL APPARATUS

CROSS-REFERENCE TO RELATED APPLICATION

This application is based upon and claims the benefit of priority from prior Japanese Patent Application No. 2020-155066, filed Sep. 16, 2020, the entire contents of which are incorporated herein by reference.

FIELD

Embodiments described herein relate generally to an optical apparatus.

BACKGROUND

Contactless object shape measurement is used in a variety of industries. In the contactless object shape measurement, for example, a ray is dispersed into rays to illuminate an object, an imaging device acquires an image of each of the rays, and a processing unit or the like estimates a direction of each of the rays. In this measurement, it is required that a direction of each of the rays can be identified.

DETAILED DESCRIPTION

Figure 1:
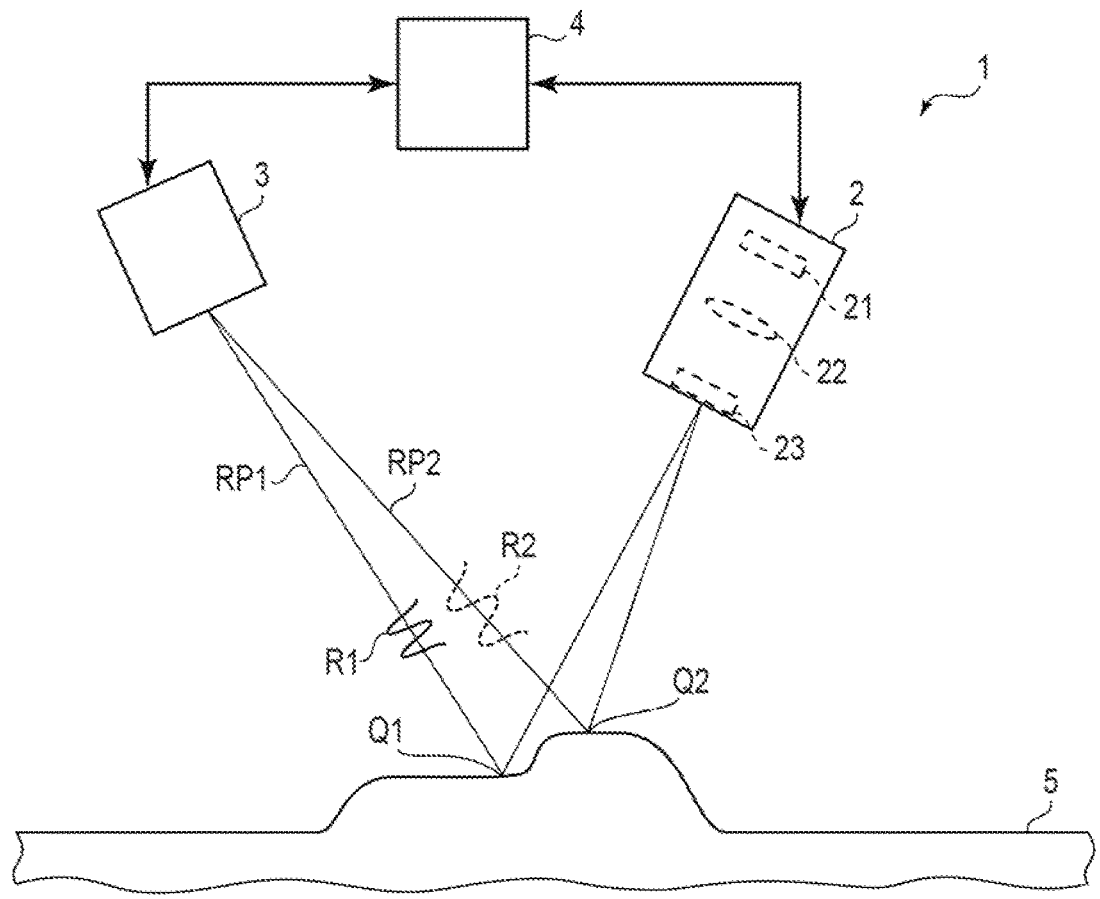
FIG. 1 is a schematic diagram showing an example of an optical apparatus according to a first embodiment.

According to an embodiment, an optical apparatus includes an illumination unit, an imaging unit and a processing unit. The illumination unit emits a first ray having a first wavelength and a second ray having a second wavelength different from the first wavelength to an object. The imaging unit includes a first pixel which receives the first ray emitted to the object and a second pixel which receives the second ray emitted to the object to capture an image based on the first ray received by the first pixel and the second ray received by the second pixel. The processing unit calculates a first ray direction of the first ray and a second ray direction of the second ray based on the image captured by the imaging unit.

Embodiments will be described with reference to the drawings. The drawings are schematic or conceptual. The relationship between the thickness and width of each of the components or the size ratio between the components in the drawings is not always the same as the actual one. The components shown in the drawings may be different in dimension or ratio from the actual ones. Redundant descriptions will be omitted as appropriate.

In the following embodiments and modifications, rays from ambient light other than an illumination unit are offset. In other words, when the intensity of the ambient light cannot be ignored in comparison with that of light from the illumination unit, an imaging unit 2 captures an image in advance by the ambient light. Then, an optical apparatus 1 is set so as to offset the intensity corresponding to the image captured by the ambient light. Alternatively, the threshold value of a discrete hue pixel value is set in consideration of the ambient light. The following embodiments and modifications will be described on the assumption that the surface 5 of an object reflects light, but the embodiments or the modifications are not limited thereto. For example, if the object is transparent to a ray, the surface 5 is a transmitting surface. In this case, the ray passes through the transmitting surface and enters the imaging unit 2.

First Embodiment

FIG. 1 is a schematic diagram showing an example of an optical apparatus according to a first embodiment. The optical apparatus 1 includes an imaging unit 2, an illumination unit 3 and a processing unit 4. In the first embodiment, light is defined as an electromagnetic wave. The light is, for example, visible light, X rays, infrared rays, near infrared rays, far infrared rays and a microwave. The light may be coherent light or incoherent light. The coherent light is, for example, light from a laser light source. The incoherent light is, for example, light from a light emitting device (LED). The light source of the illumination unit 3 has only to emit visible light. The visible light is light whose wavelength is 400 nm through 800 nm. The light source of the illumination unit 3 is, for example, an LED.

The imaging unit 2 includes a sensor 21, a lens 22 and a shutter 23. The sensor 21 includes a plurality of independent pixels. Each of the pixels selectively receives light of at least a first wavelength and a second wavelength through a wavelength filter. The sensor 21 is, for example, a line sensor or an area sensor. The imaging unit 2 images the surface of an object on the sensor 21 through the lens 22. The imaging unit 2 can control the shutter 23 to adjust exposure time. The shutter 23 may be a mechanical shutter or an electrical shutter. As one example, the electrical shutter is included in the line sensor or the area sensor.

The illumination unit 3 emits light toward the surface 5 of the object. The surface 5 reflects the light. The illumination unit 3 emits a first ray R1 and a second Ray R2. The first ray R1 has a first wavelength spectrum containing a first wavelength as a main component. The second ray R2 has a second wavelength spectrum containing a second wavelength as a main component. The second wavelength spectrum differs from the first wavelength spectrum. As shown in FIG. 1, the first ray R1 is emitted from the illumination unit 3 along a first ray path RP1, and the second ray R2 is emitted therefrom along a second ray path RP2. The ray path is a path along a virtual line connecting the light source of the illumination unit 3 and the object that reflects the ray. The time at which the first ray R1 is emitted from the illumination unit 3 is shifted from the time at which the second ray R2 is emitted from the illumination unit 3. A difference between the first and second wavelengths is relatively small. As one example, the first wavelength is 500 nm (blue light) and the second wavelength is 550 nm (green light). That is, the difference between the first and second wavelengths is 50 nm.

The processing unit 4 is, for example, a computer. The processing unit 4 includes a central processing unit (CPU), a processor or an integrated circuit (control circuit) including an application specific integrated circuit (ASIC), a field programmable gate array (FPGA) or the like, and a storage medium such as a memory. The processing unit 4 may include one or a plurality of processors or integrated circuits. The processing unit 4 performs a process based on programs and the like stored in the storage medium.

The processing unit 4 controls the imaging unit 2 and the illumination unit 3. The processing unit 4 controls the imaging unit 2 and the illumination unit 3 to synchronize them with each other. As one example, the processing unit 4 controls the shutter 23 in cooperation with the imaging unit 2 immediately after the illumination unit 3 emits a ray to cause the imaging unit 2 to start imaging an object. The processing unit 4 closes the shutter 23 of the imaging unit 2 in cooperation with the imaging unit 2 immediately after the imaging unit 2 receives the ray reflected by the surface 5 of the object. Accordingly, the imaging unit 2 stops imaging the surface 5 of the object.

As shown in FIG. 1, in the first embodiment, the illumination unit 3 emits the first ray R1. The processing unit 4 opens the shutter 23 in cooperation with the imaging unit 2 immediately after the illumination unit 3 emits the first ray R1 to cause the imaging unit 2 to start imaging the surface 5 of the object. The first ray R1 enters a first reflection region Q1 of the surface 5 of the object and is reflected by the surface 5 of the object. Accordingly, the reflected ray enters the imaging unit 2 at first time.

Then, the illumination unit 3 emits the second ray R2. The second ray R2 enters a second reflection region Q2 of the surface 5 of the object and is reflected by the surface 5 of the object. The second reflection region Q2 differs from the first reflection region Q1 on the surface 5 of the object. Thus, the reflected ray of the second ray R2 enters the imaging unit 2 at second time. The imaging unit 2 continues imaging until the second ray R2 enters the imaging unit 2. The processing unit 4 closes the shutter of the imaging unit 2 in cooperation with the imaging unit 2 after the second ray R2 enters the imaging unit 2. In other words, the imaging unit 2 stops imaging the surface 5 of the object by the second ray R2. When the processing unit 4 synchronizes the imaging unit 2 and the illumination unit 3 as described above, the imaging unit 2 images the surface 5 of the object. Thus, the imaging unit 2 captures images by both the first and second rays R1 and R2. As one example, the captured image is a single image.

In the foregoing optical apparatus 1, the illumination unit 3 emits the first ray R1 and the second ray R2 in sequence to the surface 5 of the object. The imaging unit 2 receives the reflected light of the first ray R1 reflected by the first reflection region Q1 of the surface 5 of the object and the reflected light of the second ray R2 reflected by the second reflection region Q2 thereof through the pixels arranged in the sensor 21. As one example, the optical apparatus 1 receives the reflected light of the first ray R1 through a first pixel PX1 (see FIG. 3) and receives the reflected light of the second ray R2 through a second pixel PX2 (see FIG. 3). In measurements using the optical apparatus 1, a three-dimensional positional relationship among the imaging unit 2, the illumination unit 3 and the surface 5 of the object, a three-dimensional position of an optical element provided in the illumination unit 3 (start position of the ray path), and a three-dimensional position (placement) of pixels in the sensor 21 of the imaging unit 2 are preset values (known values).

In the above case, the ray direction of the first ray R1 (first ray direction) and the ray direction of the second ray R2 (second ray direction) can be calculated by distinguishing the first and second rays R1 and R2 from each other. That is, the ray direction of the first ray R1 from the first reflection region Q1 to the first pixel PX1 is calculated based on the ray direction of the first ray R1 and the first reflection region Q1. The ray direction of the second ray R2 from the second reflection region Q2 to the second pixel PX2 is calculated based on the ray direction of the second ray R2 and the second reflection region Q2. In addition, three-dimensional position information of a reflection region of the surface 5 of the object can be calculated based on the principle of triangulation from the foregoing preset values (three-dimensional positional relationship of the imaging unit 2, etc., three-dimensional position of the optical element, and three-dimensional position of the pixels) and the ray directions of the first and second rays R1 and R2.

It is thus important for the optical apparatus 1 to distinguish the ray directions of the first and second rays R1 and R2. In the first embodiment, a plurality of rays emitted from the illumination unit 3, namely, the first and second rays R1 and R2 have different wavelength spectra. The imaging unit 2 and the processing unit 4 can thus acquire a set of discrete hue pixel values for each of the rays in cooperation with each other to distinguish the ray directions of the rays, as will be described later. In the optical apparatus 1, therefore, the shape of the surface 5 of the object can be obtained even when the wavelength spectra of the rays are close to each other.

Figure 2:
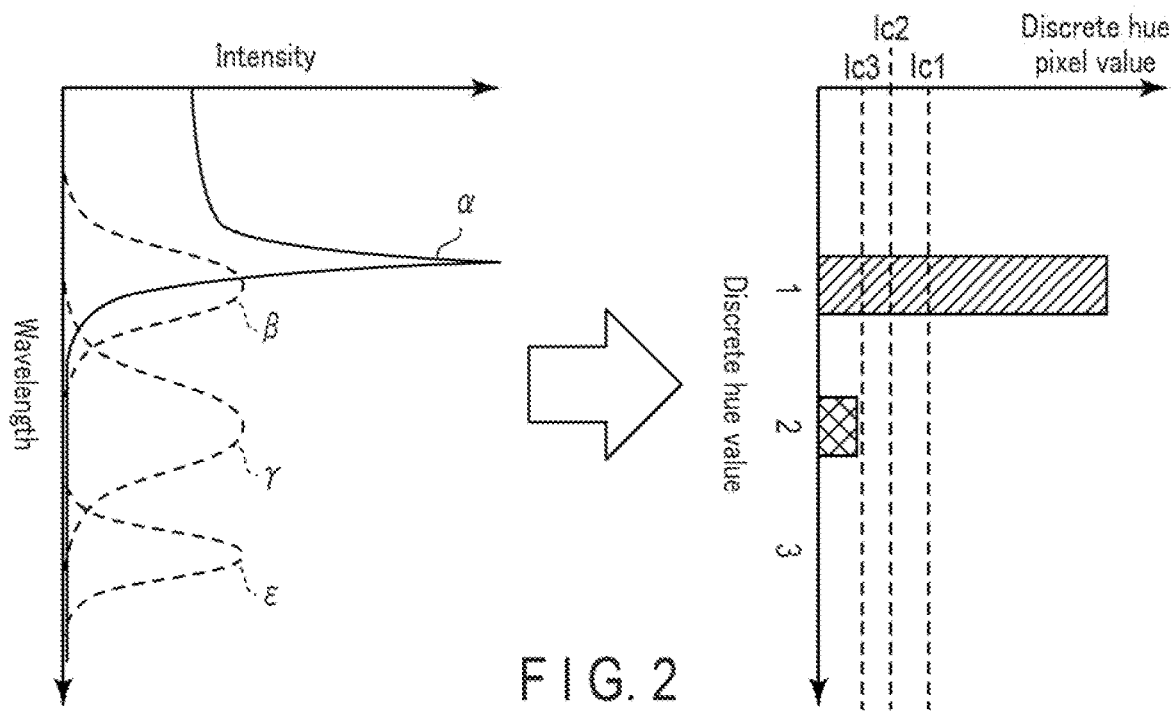
FIG. 2 is a schematic diagram showing an example of the relationship between a light spectrum reflected by the surface of an object and a discrete hue value in the optical apparatus according to the first embodiment.

FIG. 2 is a schematic diagram showing an example of the relationship between a spectrum of light reflected by the surface of an object and a discrete hue value in the optical apparatus according to the first embodiment. On the left side of FIG. 2, the relationship between the wavelength and intensity of a ray spectrum (line α) reflected by the surface of an object is schematically shown. In FIG. 2, the vertical axis indicates the wavelength and the horizontal axis indicates the intensity. Also, on the left side of FIG. 2, a transmission spectrum (lines β, γ and ε) of the wavelength filter provided in the sensor of the imaging unit 2. In the first embodiment, the sensor 21 of the imaging unit 2 includes first, second and third wavelength filters. The transmission spectrum of the first wavelength filter is indicated by line β. The transmission spectrum of the second wavelength filter is indicated by line γ. The transmission spectrum of the third wavelength filter is indicated by line ε.

On the right side of FIG. 2, the relationship between a discrete hue value and a discrete hue pixel value obtained after the light reflected by the surface of an object passes through the wavelength filter of the imaging unit, is schematically shown. The discrete hue value is a discrete value (number) set for each of the wavelengths identified by the wavelength filter. In the first embodiment, the discrete hue value corresponding to the first wavelength filter is 1, the discrete hue value corresponding to the second wavelength filter is 2, and the discrete hue value corresponding to the third wavelength filter is 3. The discrete hue value may be set to correspond to a symbol such as RGB. The number of discrete hue values is also called a discrete hue number. In the first embodiment, the discrete hue number is 3. Using two or more discrete hue numbers, the change of a hue is easy to identify. The discrete hue pixel value is a discrete numerical value obtained by converting the light intensity of a wavelength corresponding to each of the discrete hue values. Thus, the discrete hue pixel values corresponding to the discrete hue values are different depending on the wavelength spectrum of light incident on the imaging unit 2. Of the discrete hue values, a discrete hue value corresponding to the largest discrete hue pixel value is referred to as a representative discrete hue value. The combination of discrete hue pixel values for a certain ray is represented as a set of discrete hue pixel values. In the first embodiment, the set of discrete hue pixel values is represented as a vector. That is, in the set of discrete hue pixel values, column numbers correspond to the discrete hue values, and each value of the columns is a discrete hue pixel value corresponding to the discrete hue value.

As one example, the discrete hue pixel values are represented by 8-bit discrete gradations. In this case, the upper limit value of the discrete hue pixel values is 255 in the decimal system, and the lower limit value thereof is 0 in the decimal system. In the example of FIG. 2, the discrete hue pixel value corresponding to discrete hue value 1 (first wavelength filter) is 255, the discrete hue pixel value corresponding to discrete hue value 2 (second wavelength filter) is 10, and the discrete hue pixel value corresponding to discrete hue value 3 (third wavelength filter) is 0. In this case, the set of discrete hue pixel values is represented as (255, 10, 0). Note that the discrete hue pixel values are not limited to those value as long as they are represented by discrete gradations.

As shown in the example of FIG. 2, the transmission spectra (wavelength distributions) of the wavelength filters may overlap each other. In this case, a threshold value is set to the discrete hue pixel values. If the discrete hue pixel values are less than or equal to the threshold value, they are set to 0. The setting of a threshold value to the discrete hue pixel values prevents two discrete hue values from being set to a wavelength corresponding to an overlapping portion of the transmission spectra. Therefore, there is a one-to-one correspondence between the discrete hue values and the wavelength regions of the wavelength filters.

Since the discrete hue number is 3 in the first embodiment, three threshold values Ic1, Ic2 and Ic3 are set to their respective discrete hue pixel values, as shown on the right side of FIG. 2. Specifically, threshold value Ic1 is set to the discrete hue pixel value of discrete hue value 1, threshold value Ic2 is set to the discrete hue pixel value of discrete hue value 2, and threshold value Ic3 is set to the discrete hue pixel value of discrete hue value 3. When the discrete hue pixel value of discrete hue value 1 is equal to or less than threshold value Ic1, the discrete hue pixel value of discrete hue value 1 is set to 0. When the discrete hue pixel value of discrete hue value 2 is equal to or less than threshold value Ic2, the discrete hue pixel value of discrete hue value 2 is set to 0. When the discrete hue pixel value of discrete hue value 3 is equal to or less than threshold value Ic3, the discrete hue pixel value of discrete hue value 3 is set to 0. The three threshold values Ic1, Ic2 and Ic3 are set appropriately for their respective discrete hue values.

Figure 3:
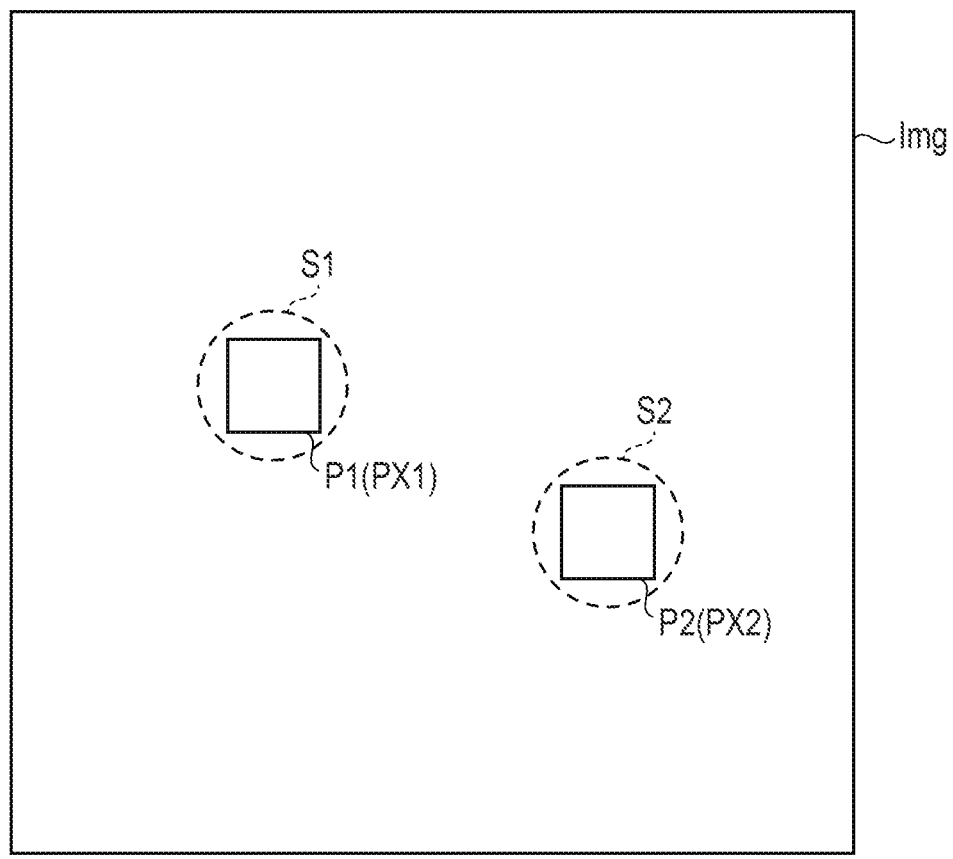
FIG. 3 is a schematic diagram showing an example of an image captured with time by an imaging unit in the optical apparatus according to the first embodiment.

FIG. 3 is a schematic diagram showing an example of an image captured by the imaging unit 2 in the optical apparatus according to the first embodiment. The image Img shown in FIG. 3 is an image captured by the imaging unit 2. The captured image (light-receiving image) corresponds to a combination of discrete hue pixel values of all pixels of the imaging unit 2. A first region P1 is a region of the captured image Img corresponding to a first pixel PX1 of the imaging unit 2. A second region P2 is a region of the captured image Img corresponding to a second pixel PX2 of the imaging unit 2. A first spot S1 is a range in the captured image Img, which is illuminated when a first ray enters the first pixel PX1. A second spot S2 is a range in the captured image Img, which is illuminated when a second ray enters the second pixel PX2.

As described above, when the first ray R1 is reflected by the first reflection region Q1 of the surface 5 of the object and enters the imaging unit 2, the second ray R2 is reflected by the second reflection region Q2 of the surface 5 of the object and enters the imaging unit 2. That is, the imaging unit 2 captures an image including both imaging of the first ray R1 and imaging of the second ray R2. In the example of FIG. 3, the first ray R1 is received by the first pixel PX1 of the imaging unit 2, and the second ray R2 is received by the second pixel PX2 of the imaging unit 2. In the captured image Img, the first region P1 corresponds to the first pixel PX1, and the second region P2 corresponds to the second pixel PX2. Thus, the first region P1 is imaging of the first ray R1 and the second region P2 is imaging of the second ray R2. In addition, there is a lower limit value in the size of the first spot S1 and the size of the second spot S2 because of a diffraction limit of light. As shown in the example of FIG. 3, therefore, the size of the first spot S1 is larger than that of the first region P1 (size of the first pixel PX1). The size of the second spot S2 is larger than the size of the second region P2 (size of the second pixel PX2). In this example, the size of the pixel of the imaging unit 2 is, for example, less than 10 μm.

As one example, a first set of discrete hue pixel values is (255, 10, 0) and a second set of discrete hue pixel values is (10, 255, 0). More specifically, in the first ray R1, the discrete hue pixel value of discrete hue value 1 is 255, that of discrete hue value 2 is 10, and that of discrete hue value 3 is 0. In the second ray R2, the discrete hue pixel value of discrete hue value 1 is 10, that of discrete hue value 2 is 255, and that of discrete hue value 3 is 0. The processing unit 4 distinguishes the ray directions of the first and second rays on the basis of a difference between the first and second sets of discrete hue pixel values.

Figure 4:
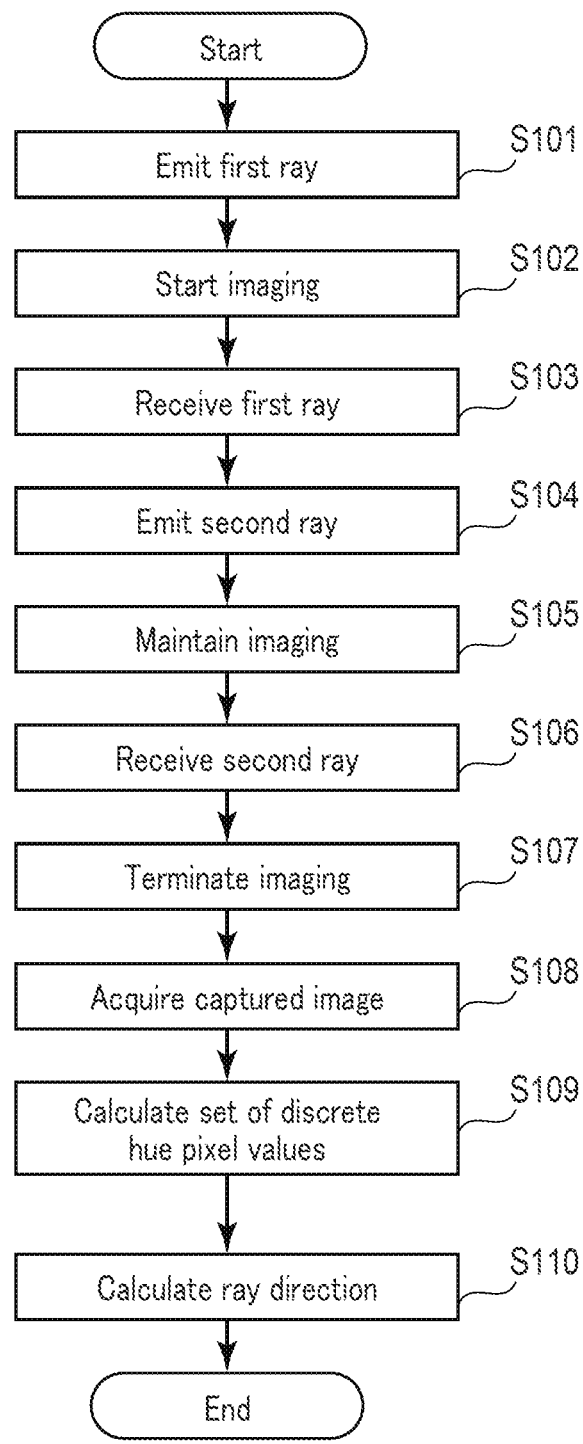
FIG. 4 is a flowchart showing an example of a process performed by a processing unit in the optical apparatus according to the first embodiment.

FIG. 4 shows an example of a process performed by the processing unit 4 of the optical apparatus 1. The process shown in FIG. 4 is performed by the processing unit 4 each time the optical apparatus 1 makes a measurement. The process shown in FIG. 4 is thus performed at least in one measurement of the optical apparatus 1.

In the optical apparatus 1, the processing unit 4 causes the illumination unit 3 to emit the first ray R1 (S101). The processing unit 4 opens the shutter of the imaging unit 2 to cause the imaging unit 2 to start imaging the surface of an object during a period of time from when the first ray R1 is emitted until it reaches the imaging unit 2 (S102). The shutter of the imaging unit 2 may be opened immediately after or before the first ray R1 is emitted. Assume that the time when a ray is received by the pixel of the imaging unit 2 is start of imaging. When the imaging unit 2 receives the reflected light of the first ray R1 (S103), the processing unit 4 causes the illumination unit 3 to emit the second ray R2 (S104). The processing unit 4 maintains the shutter of the imaging unit 2 in an open state (S105). When the imaging unit 2 receives the reflected light of the second ray R2 (S106), the processing unit 4 closes the shutter of the imaging unit 2. That is, the processing unit 4 causes the imaging unit 2 to terminate imaging (S107). The imaging unit 2 captures an image including imaging of the first ray R1 and imaging of the second ray R2.

The processing unit 4 acquires a single image captured by the imaging unit 2 (S108). The processing unit 4 calculates a first set of discrete hue pixel values, as described above, based on a part of the captured image corresponding to the imaging of the first ray R1. It also calculates a second set of discrete hue pixel values, as described above, based on a part of the captured image corresponding to the imaging of the second ray R2 (S109). The processing unit 4 calculates a ray direction of the first ray R1 based on the first set of discrete hue pixel values. The processing unit 4 calculates a ray direction of the second ray R2 based on the second set of discrete hue pixel values (S110). Since the ray directions of the first and second rays R1 and R2 are calculated as described above, the optical apparatus 1 can distinguish the ray directions of the first and second rays R1 and R2.

In the optical apparatus 1 of the first embodiment, the first and second pixels PX1 and PX2 of the imaging unit 2 receive the first and second rays R1 and R2 which are emitted from the illumination unit 3 to the surface 5 of the object. The imaging unit 2 captures an image based on the received rays, and the processing unit 4 calculates a first ray direction of the first ray R1 and a second ray direction of the second ray R2 based on the image captured by the imaging unit 2. The optical apparatus 1 of the first embodiment can thus distinguish the first and second ray directions of the first and second rays R1 and R2. Accordingly, the shape of the surface of the object can be calculated.

In the optical apparatus 1 of the first embodiment, the processing unit 4 calculates a first set of discrete hue pixel values including a discrete hue pixel value for the first ray R1 based on the first region P1 of the captured image Img corresponding to the first pixel PX1. The processing unit 4 calculates a second set of discrete hue pixel values including a discrete hue pixel value for the second ray R2 based on the second region P2 of the captured image Img corresponding to the second pixel PX2. The processing unit 4 calculates a first ray direction and a second ray direction on the basis of both the first and second sets of discrete hue pixel values. The first and second rays R1 and R2 can thus be distinguished even though they cannot be distinguished by the size of a discrete hue pixel value itself. That is, the performance of distinction between the first and second rays R1 and R2 is improved. The shape of the surface 5 of the object is easier to calculate.

In the optical apparatus 1 of the first embodiment, the processing unit 4 sets a discrete hue pixel value to 0 when the discrete hue pixel value is smaller than the threshold value. A discrete hue value can thus be set appropriately even though the transmission spectra of the wavelength filters overlap each other. Accordingly, the number of types of wavelength filters which can be selected as wavelength filters for the optical apparatus 1 increases. This makes it easier to calculate the shape of the surface 5 of the object.

Modification to First Embodiment

Figure 5:
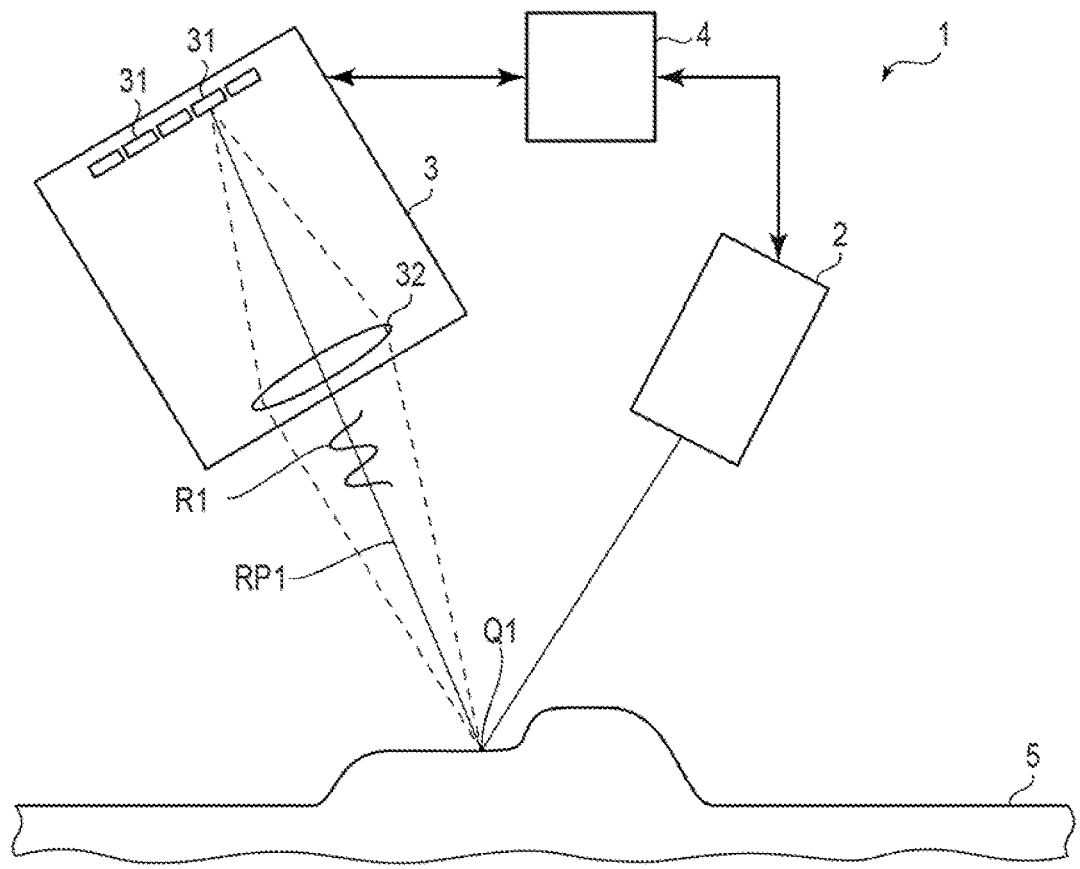
FIG. 5 is a schematic diagram showing an example of an optical apparatus according to a modification to the first embodiment.

As shown in FIG. 5, in a modification to the first embodiment, the light source of the illumination unit 3 may be a secondary light source. The secondary light source includes a light emitting device 31. The light emitting device 31 is a controllable device having the smallest light emitting area in the secondary light source. Since the light emitting device 31 is sufficiently small, it can be regarded as a point light source. The secondary light source is, for example, an LED array and a liquid crystal panel illuminated with a light source such as an LED. The liquid crystal panel includes, for example, a plurality of pixels, and light emitted from each of the pixels is controlled. Even though the light emitting device 31 is not so small as described above, if a group of rays emitted from the light emitting device 31 can be regarded substantially as parallel light, the light emitting device 31 is regarded as a point light source.

The illumination unit 3 may include an imaging optical apparatus 32. The imaging optical apparatus 32 collects a plurality of rays (group of rays) emitted from the point light source at optically conjugated positions (conjugated positions). The imaging optical apparatus 32 is, for example, a lens and a convex mirror. As one example, the light emitting device 31 emits a group of rays. The rays emitted from the light emitting device 31 are collected by the imaging optical apparatus 32 at a position optically conjugated with the position of the light emitting device 31 (conjugated position of the light emitting device 31). In this modification, the conjugated position of the light emitting device 31 is the first reflection region Q1 on the surface 5 of the object. In other words, the position of the light emitting device 31 and the first reflection region Q1 of the surface 5 of the object are optically conjugated with each other. The first ray path RP1 is a path along a line (virtual line) connecting the light emitting device 31 and the first reflection region Q1 of the surface 5 of the object. The ray direction is a direction along a line connecting the light emitting device 31 and the first reflection region Q1 of the ray of the surface 5 of the object.

The modification differs from the first embodiment in the configuration of the illumination unit 3 as described above. However, the illumination unit 3 of the modification emits the first and second rays R1 and R2 onto the surface 5 of the object in the same manner as in the first embodiment. The processing unit 4 thus performs the same process as in the first embodiment. That is, the processing unit 4 performs the processes in steps S101 to S110 shown in FIG. 4. The optical apparatus 1 can thus distinguish the first and second ray directions of the first and second rays R1 and R2 as in the first embodiment.

The modification produces the following operations and advantages in addition to those of the foregoing first embodiment. In the modification, the illumination unit 3 includes the light emitting device 31 and imaging optical apparatus 32 as described above. The illumination unit 3 can thus apply rays to the first reflection region Q1 from various directions. Furthermore, the rays are reflected in various directions from the first reflection region Q1 by changing the direction in which the rays are emitted. The reflected light of the rays easily reaches the imaging unit 2. For example, even when the surface 5 of the object is a glossy surface of metal or the like, that is, when the specular reflection is strong on the surface 5 of the object, the rays easily reach the imaging unit 2. Therefore, the shape of the surface 5 of the object is much easier to calculate because the optical apparatus 1 can distinguish the ray directions regardless of the surface 5 of the object.

Second Embodiment

The optical apparatus 1 according to a second embodiment is similar to the optical apparatus 1 according to the foregoing first embodiment, and includes an imaging unit 2, an illumination unit 3 and a processing unit 4. In the optical apparatus 1 of the second embodiment, the wavelength spectra of first and second rays R1 and R2 emitted from the illumination unit 3 are different from each other, and the main wavelengths of the first and second rays R1 and R2 are close to each other. The main wavelength here is a wavelength at which the wavelength spectrum of a ray reflected by a perfect white plate by the imaging unit 2 becomes maximum in the transmission region of the transmission spectrum of a wavelength filter corresponding to a discrete hue value having the largest discrete hue pixel value. The perfect white plate has the same reflectance spectrum for all wavelengths. The following is a description of the case where the first ray R1 enters the first pixel PX1 and the second ray R2 enters the second pixel PX2, as in the first embodiment.

In the second embodiment, when the illumination unit 3 emits the first ray R1, the processing unit 4 opens the shutter 23 immediately after or before the emission of the first ray R1 to cause the imaging unit 2 to start to image the surface 5 of an object. The first ray R1 enters the first reflection region Q1 of the surface 5 of the object and is reflected by the surface 5. Accordingly, the reflected ray of the first ray R1 enters the first pixel PX1 of the imaging unit 2 at first time t1. Then, the illumination unit 3 emits the second ray R2. The second ray R2 enters the second reflection region Q2 of the surface 5 of the object and is reflected by the surface 5. The second reflection region Q2 is a reflection region other than the first reflection region Q1 on the surface 5. Accordingly, the reflected ray of the second ray R2 enters the second pixel PX2 of the imaging unit 2 at second time t2. The processing unit 4 cooperates with the imaging unit 2 to close the shutter 23 of the imaging unit 2 almost at the same time when or immediately after the second ray R2 enters the second pixel PX2 of the imaging unit 2. In other words, the imaging unit 2 stops imaging the surface 5 of the object by the first ray R1.

In the above case, the second pixel PX2 of the imaging unit 2 hardly receives the reflected ray of the second ray R2. In the imaging unit 2, the time for receiving (exposing) the reflected ray of the second ray R2 is shorter than the time for receiving (exposing) the reflected ray of the first ray R1. The imaging unit 2 thus acquires a first image Img1 captured mainly by the first ray R1. Then, the processing unit 4 cooperates with the imaging unit 2 to open the shutter 23 of the imaging unit 2. The illumination unit 3 continues to emit the second ray R2 even while the shutter 23 of the imaging unit 2 is closed. Accordingly, the reflected ray of the second ray R2 enters the imaging unit 2 at second time t2. The processing unit 4 closes the shutter 23 of the imaging unit 2 in cooperation with the imaging unit 2 after the second ray R2 enters the imaging unit 2. In other words, the imaging unit 2 stops imaging the surface 5 of the object by the second ray R2. The imaging unit 2 thus acquires a second image Img2 captured by the second ray R2. In other words, in the second embodiment, the imaging unit 2 acquires the first image Img1 captured by the first ray R1 and the second image Img2 captured by the second ray R2.

Figure 6:
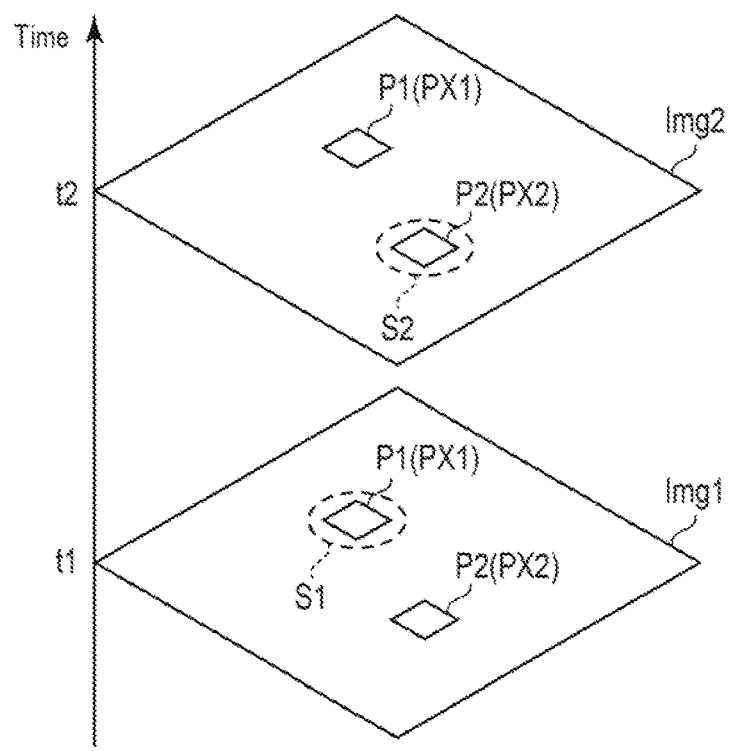
FIG. 6 is a schematic diagram showing an example of an image captured with time by an imaging unit in an optical apparatus according to a second embodiment.

FIG. 6 is a schematic diagram showing in time series an example of the first and second images Img1 and Img2 captured by the imaging unit 2 in the optical apparatus according to the second embodiment. In FIG. 6, the vertical axis indicates elapsed time of measurement by the optical apparatus 1. The first image Img1 is a captured image acquired by the imaging unit 2 based on the first ray R1. The second image Img2 is a captured image acquired by the imaging unit 2 based on the second ray R2. In the second embodiment, the first and second captured images Img1 and Img2 are acquired as described above. Thus, a first region P1 corresponding to the imaging of the first pixel PX1 exists in the first captured image Img1, and a second region P2 corresponding to the imaging of the second pixel PX2 exists in the second captured image Img2. The processing unit 4 calculates a set of first discrete hue pixel values in the first region P1 based on the first captured image Img1. The processing unit 4 also calculates a second set of discrete hue pixel values in the second region P2 based on the second captured image Img2. Like in the foregoing first embodiment, the processing unit 4 distinguishes the ray directions of the first and second rays based on a difference between the first and second sets of discrete hue pixel values.

Figure 7:
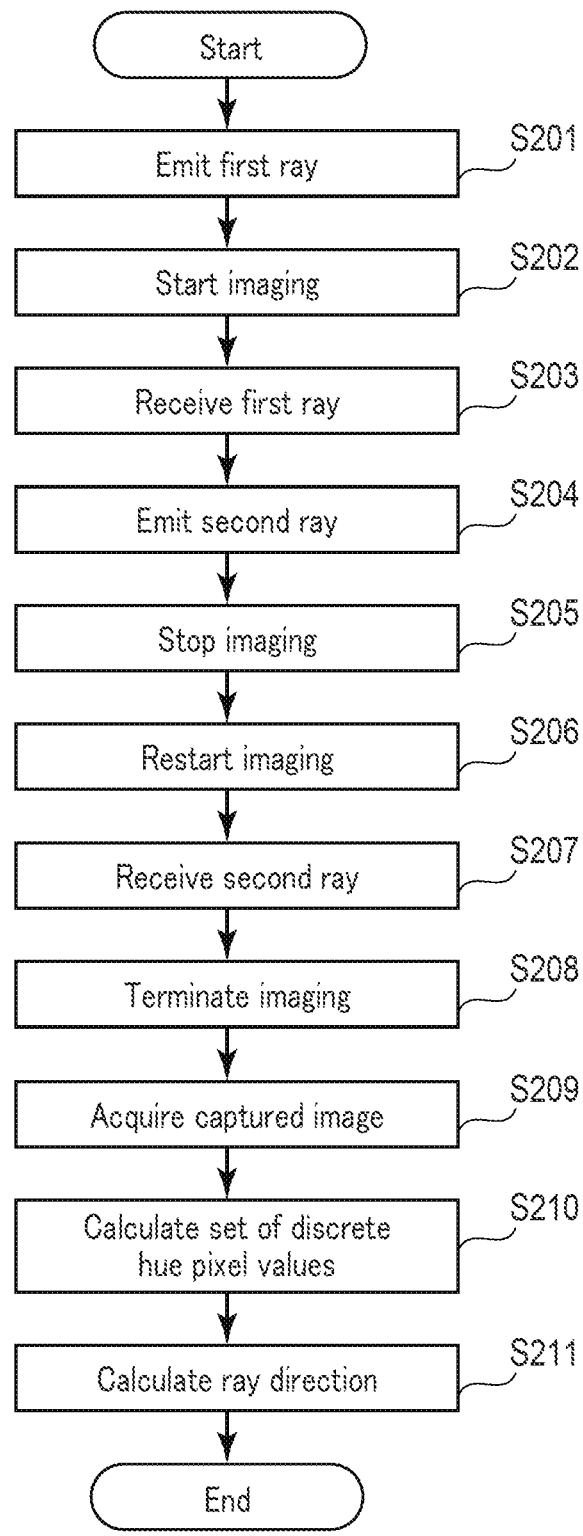
FIG. 7 is a flowchart showing an example of a process to be performed by a processing unit in the optical apparatus according to the second embodiment.

FIG. 7 shows an example of a process to be performed by the processing unit 4 of the optical apparatus 1. Steps S201 to S204 are the same as steps S101 to S104 of the first embodiment shown in FIG. 4. In the second embodiment, the processing unit performs the process of step S204 and then closes the shutter of the imaging unit 2 almost at the same time when or immediately after the second ray R2 enters the second pixel PX2 of the imaging unit 2. Accordingly, the processing unit 4 causes the imaging unit 2 to stop the imaging (S205). Thus, a first captured image Img1 is acquired mainly based on the first ray. The processing unit 4 causes the imaging unit 2 to restart imaging (S206). Steps S208 to S211 are the same as steps S107 to S110 of the first embodiment shown in FIG. 4. In steps S209 and S210, however, the processing unit 4 performs a process associated with the first ray R1 based on the first captured image Img1, and performs a process associated with the second ray R2 based on the second captured image Img2. Since the directions of the first and second rays R1 and R2 are calculated as described above, the optical apparatus 1 can distinguish the directions.

The second embodiment produces the following operations and advantages in addition to the same operations and advantages as those of the first embodiment and the modification. That is, in the second embodiment, the direction of the first ray R1 is calculated based on the first captured image Img1, and the direction of the second ray R2 is calculated based on the second captured image Img2. Thus, even though the main wavelengths of the first and second wavelength spectra are close to each other, the optical apparatus 1 can distinguish the directions of the first and second rays R1 and R2. Accordingly, an error in distinction between the ray directions is reduced, and the ray directions are distinguished with high accuracy. Thus, the calculation accuracy of the shape of the surface 5 of the object is further improved.

Furthermore, in the second embodiment, the main wavelengths of the rays emitted from the illumination unit 3 are shifted from each other between the first and second rays R1 and R2. The optical apparatus 1 can thus monitor synchronization between the imaging unit 2 and the illumination unit 3. When the imaging unit 2 and the illumination unit 3 are not synchronized with each other, the synchronization can be corrected by controlling the imaging unit 2 and the illumination unit 3. For example, a shift in synchronization between the imaging unit 2 and the illumination unit 3 is caused when the shutter 23 of the imaging unit 2 opens and closes at a high speed. Since the synchronization can be corrected in the second embodiment, the shutter 23 of the imaging unit 2 can open and close at a higher speed. Thus, the shape of the surface of the object is calculated at much higher speed.

In addition, the emission timing of the first ray R1 and the emission timing of the second ray R2 can be brought close to each other within the range of conditions under which the ray directions can be distinguished. Thus, when the surface 5 of the object is measured by the optical apparatus 1, lead time in this measurement is shortened. Furthermore, even though the first and second rays R1 and R2 are simultaneously exposed to the imaging unit 2, the optical apparatus 1 can distinguish the directions of the first and second rays R1 and R2. Thus, the performance of distinction between the ray directions is further improved, and the speed at which the shape of the surface of the object is calculated, is further increased.

Modification to Second Embodiment

In a modification, the illumination unit 3 can emit the first and second rays R1 and R2 to an object with the receptions of the first and second rays R1 and R2 shifted from each other in the imaging unit 2. As one example, even though the illumination unit 3 emits the second ray R2 after it emits the first ray R1, the imaging unit 2 receives the second ray R2 and then the first ray R1 according to the shape of the surface 5 of the object. Although the receptions of the first and second rays R1 and R2 are shifted in the imaging unit 2, the emission orders of the rays from the illumination unit 3 do not coincide with each other. In this case, the processing unit 4 can distinguish the first and second rays R1 and R2 by their respective main wavelengths. In other words, the processing unit 4 can distinguish the first and second rays R1 and R2 by their respective hues. For example, in the case of time of flight (TOF) to measure a distance to an object using a period of time from when a ray is reflected by the object until the reflected ray reaches the imaging unit 2, the optical apparatus 1 can distinguish the first and second rays R1 and R2 as described above. In the optical apparatus 1 of the present modification therefore, the performance of distinction between the ray directions can be further improved, and the speed at which the shape of the surface 5 of the object can be estimated with high accuracy and at high speed. In the present modification, too, the optical apparatus 1 performs the same process as described above and thus produces the same operations and advantages as those of the foregoing embodiments and the modification.

In a modification, the optical apparatus 1 may include a plurality of imaging units 2. The imaging units 2 may have the same configuration or different configurations. However, the imaging units 2 have at least a configuration capable of receiving rays from the illumination unit 3. As one example, the optical apparatus 1 includes two imaging units. In the present modification, therefore, the optical apparatus 1 can acquire more information about the shape of the surface 5 of the object. In this case, even though there is a shift in synchronization between the imaging units 2, the processing unit 4 can synchronize the imaging units 2 by distinguishing the hues of the rays. In the present modification, too, the optical apparatus 1 performs the same process as described above and thus produces the same operations and advantages as those of the foregoing embodiments and the modification.

Third Embodiment

The optical apparatus 1 according to a third embodiment is the same as the optical apparatus 1 according to the foregoing embodiments. Like in the optical apparatus 1 according to the second embodiment, in the optical apparatus 1 according to the third embodiment, the first and second rays R1 and R2 differ in wavelength spectrum from each other, and they have main wavelengths close to each other. The following is a description of the case where the first ray R1 enters the first pixel PX1 and the second ray R2 enters the second pixel PX2, as in the foregoing embodiments.

In the third embodiment, in the imaging unit 2, the second pixel PX2 is located close to the first pixel PX1. As one example, the second pixel PX2 is adjacent to the first pixel PX1. The processing unit 4 controls the imaging unit 2 and the illumination unit 3 as in the second embodiment. However, unlike in the second embodiment, the processing unit 4 closes the shutter 23 of the imaging unit 2 immediately after the reflected ray of the first ray R1 enters the first pixel PX1 of the imaging unit 2. In other words, the processing unit 4 closes the shutter 23 of the imaging unit 2 immediately before the reflected ray of the second ray R2 enters the imaging unit 2. The imaging unit 2 thus acquires a first captured image Img1 by the first ray R1. In the third embodiment, therefore, the reflected ray of the second ray R2 is not imaged on the first captured image Img1.

Figure 8:
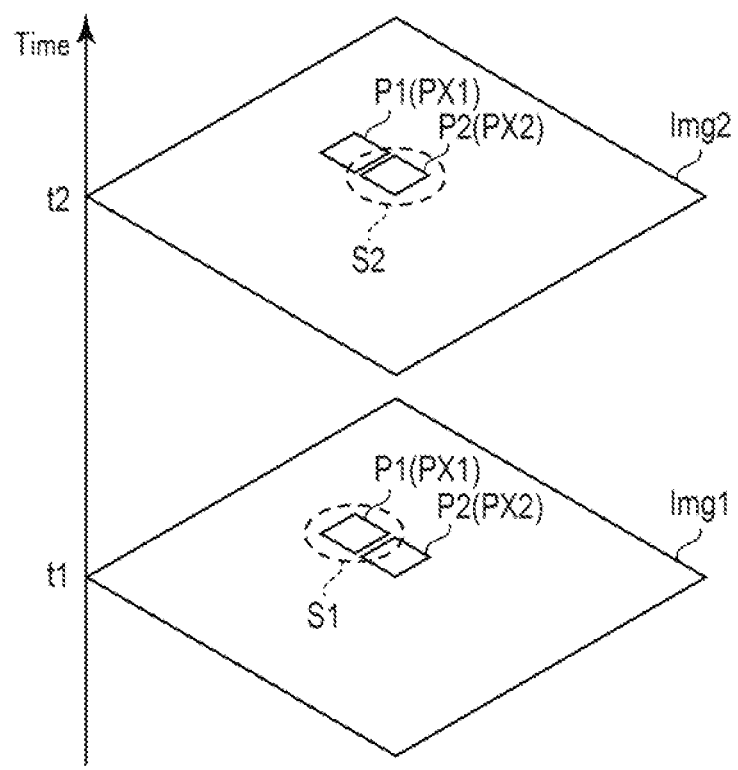
FIG. 8 is a schematic diagram showing an example of an image captured with time by an imaging unit in an optical apparatus according to a third embodiment.

FIG. 8 is a schematic diagram showing in time series an example of the first and second images Img1 and Img2 captured by the imaging unit 2 in the optical apparatus according to the third embodiment. In FIG. 8, the vertical axis indicates elapsed time of measurement by the optical apparatus 1. In the third embodiment, the second pixel PX2 is located close to the first pixel PX1 in the imaging unit 2. As shown in the example of FIG. 8, therefore, the second region P2 is located close to the first region P1 in the first and second captured images Img1 and Img2. Because of the foregoing diffraction limit of light, the first spot S1 and the second spot S2 are larger than the first region P1 and the second region P2, respectively. Thus, the first spot S1 overlaps with the second region P2, and the second spot S2 overlaps with the first region P1. That is, the first ray R1 may be received by part of the second pixel PX2, and the second ray R2 may be received by part of the first pixel PX1.

In the third embodiment, the processing unit 4 closes the shutter 23 of the imaging unit 2 immediately before the reflected ray of the second ray R2 enters the imaging unit 2, as described above. Therefore, even though the spots S1 and S2 overlap with both the pixels PX1 and PX2 as described above, the second ray R2 is not emitted to the first pixel PX1 or the first ray R1 is not emitted to the second pixel PX2. Like in the second embodiment, the processing unit 4 calculates a first set of discrete hue pixel values and a second set of discrete hue pixel values based on the first and second captured images Img1 and Img2.

In the third embodiment, the processing unit 4 performs the same steps as steps S201 to S211 of the second embodiment shown in FIG. 7. However, after the processing unit 4 performs step S204, it closes the shutter 23 of the imaging unit 2 immediately before the second ray R2 enters the second pixel PX2 of the imaging unit 2. Accordingly, the imaging unit 2 stops imaging (S205). Since the first and second ray directions are calculated as described above, the optical apparatus 1 can distinguish the first and second ray directions.

The third embodiment produces the following operations and advantages in addition to the same operations and advantages as those of the foregoing embodiments and modifications. That is, in the third embodiment, the processing unit 4 closes the shutter 23 of the imaging unit 2 immediately before the second ray R2 enters the second pixel PX2 of the imaging unit 2, and the imaging unit 2 acquires the first captured image Img1. The first captured image Img1 is acquired while not being exposed to the second ray R2. Accordingly, an error in distinction between the ray directions is reduced, and the ray directions are distinguished with higher accuracy. Thus, the calculation accuracy of the shape of the surface of the object is further improved.

First Modification to Third Embodiment

Figure 9:
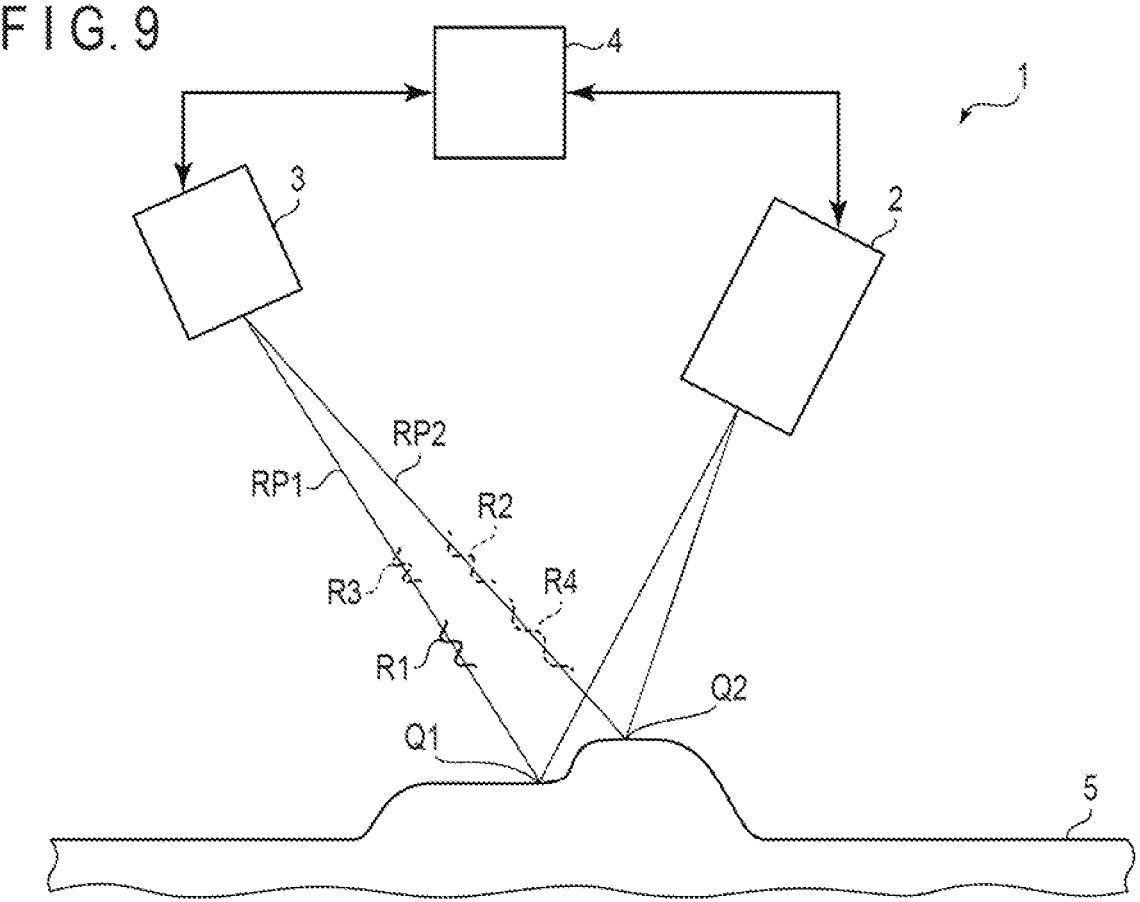
FIG. 9 is a schematic diagram showing an example of an optical apparatus according to a first modification to the third embodiment.

The optical apparatus 1 according to a first modification to the third embodiment is the same as the optical apparatus 1 according to the foregoing embodiments. As shown in FIG. 9, the present modification differs from the foregoing embodiments and modifications in that the illumination unit 3 emits third and fourth rays R3 and R4 in addition to the first and second rays R1 and R2. The third ray R3 and the fourth ray R4 have a third wavelength spectrum whose main component is a third wavelength and a fourth wavelength spectrum whose main component is a fourth wavelength, respectively. The first to fourth wavelength spectra are different from one another. There is almost no difference or a relatively small difference between the first and fourth wavelengths, and there is a relatively large difference between the second and third wavelengths. As one example, the first wavelength is 450 nm (blue light), the second wavelength is 650 nm (red light), the third wavelength is 450 nm (blue light), and the fourth wavelength is 550 nm (green light). That is, the third wavelength is the same as the first wavelength. Note that the first to fourth wavelengths are not limited to these values.

As shown in FIG. 9, the first and third rays R1 and R3 are emitted from the illumination unit 3 along the first ray path RP1. The fourth and second rays R4 and R2 are emitted from the illumination unit 3 along the second ray path RP2. The direction of the third ray R3 coincides or substantially coincides with that (first ray direction) of the first ray R1. The direction of the fourth ray R4 coincides or substantially coincides with the that (second ray direction) of the second ray R2. The time at which the first ray R1 is emitted from the illumination unit 3 is almost the same as the time at which the fourth ray R4 is emitted from the illumination unit 3. The time at which the third ray R3 is emitted from the illumination unit 3 is almost the same as the time at which the second ray R2 is emitted from the illumination unit 3. In other words, the first and fourth rays R1 and R4 are emitted from the illumination unit 3 substantially at the same time, and the second and third rays R2 and R3 are emitted from the illumination unit 3 substantially at the same time. The fact that the rays are emitted from the illumination unit 3 substantially at the same time means that the processing unit 4 (imaging unit 2) recognizes that at least two different rays have reached the imaging unit 2 simultaneously. In other words, it is defined whether the rays have reached simultaneously or not on the basis of time resolution of the processing unit 4.

In the present modification, when the illumination unit 3 emits the first and fourth rays R1 and R4, the processing unit 4 opens the shutter 23 immediately after the first and fourth rays R1 and R4 are emitted, and causes the imaging unit 2 to start to image the surface 5 of the object. The first ray R1 is reflected by the first reflection region Q1, and the fourth ray R4 is reflected by the second reflection region Q2. Accordingly, the reflected ray of the first ray R1 enters the first pixel PX1 of the imaging unit 2, and the reflected ray of the fourth ray R4 enters the second pixel PX2 of the imaging unit 2. The processing unit 4 closes the shutter 23 of the imaging unit 2 immediately after the reflected ray of the first ray R1 (reflected ray of the fourth ray R4) enters the first pixel PX1 (second pixel PX2). The imaging unit 2 thus acquires the first captured image Img1 by the first and fourth rays R1 and R4.

Then, the illumination unit 3 emits the third and second rays R3 and R2. The third ray R3 is reflected by the first reflection region Q1, and the second ray R2 is reflected by the second reflection region Q2. The processing unit 4 opens the shutter 23 of the imaging unit 2 before the reflected ray of the third ray R3 and the reflected ray of the second ray R2 enter the imaging unit 2. Thus, the reflected ray of the first ray R1 enters the first pixel PX1 of the imaging unit 2, and the reflected ray of the second ray R2 enters the second pixel PX2 of the imaging unit 2. After that, the processing unit 4 closes the shutter 23 of the imaging unit 2. In other words, the imaging unit 2 stops the imaging of the surface 5 of the object by the third and second rays R3 and R2. The imaging unit 2 thus acquires the second captured image Img2 by the third ray R3 and the second ray R2.

Figure 10:
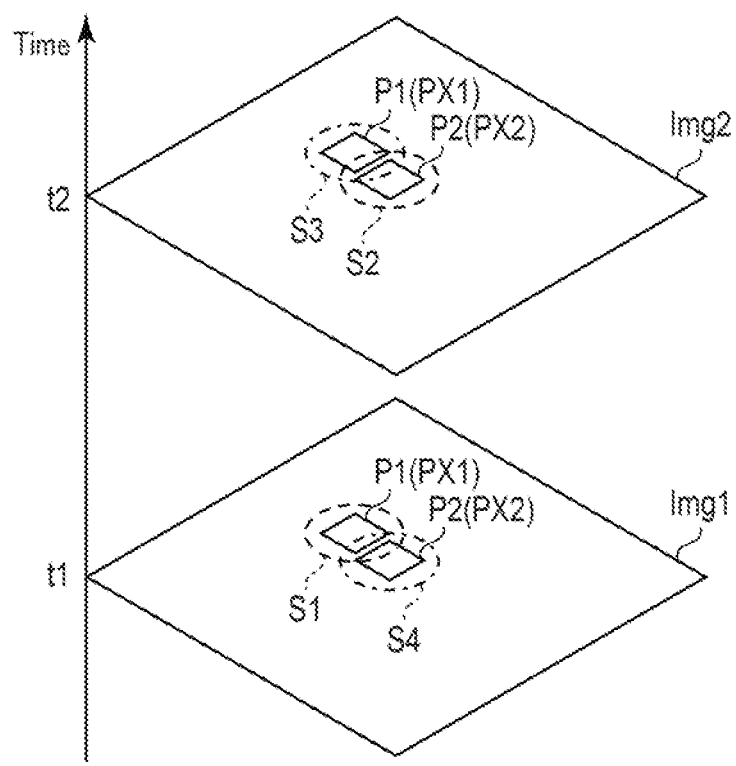
FIG. 10 is a schematic diagram showing an example of an image captured with time by an imaging unit in the optical apparatus according to the first modification to the third embodiment.

FIG. 10 is a schematic diagram showing in time series an example of the images captured by the imaging unit 2 in the optical apparatus according to the present modification. In FIG. 10, the vertical axis indicates elapsed time of measurement by the optical apparatus 1. In this modification, too, the second pixel PX2 is located close to the first pixel PX1 in the imaging unit 2. As shown in the example of FIG. 10, therefore, the first and third rays R1 and R3 may be received by part of the second pixel PX2, and the fourth and second rays R4 and R2 may be received by part of the first pixel PX1. In addition, the first and fourth rays R1 and R4 enter the imaging unit 2 substantially at the same time, and the third and second rays R3 and R2 enter the imaging unit 2 substantially at the same time.

In the first captured image Img1, the first pixel PX1 mainly receives the first ray R1 and also receives the fourth ray R4 substantially simultaneously with the first ray R1. The second pixel PX2 mainly receives the fourth ray R4 and also receives the first ray R1 substantially simultaneously with the fourth ray R4. The processing unit 4 calculates a first set of discrete hue pixel values corresponding to the first pixel PX1 and a second set of discrete hue pixel values corresponding to the second pixel PX2 in the first captured image Img1. Specifically, the discrete hue pixel values in the first pixel PX1 and the discrete hue pixel values in the second pixel PX2 are the sum of the discrete hue pixel values corresponding to the first and second rays R1 and R4. Since, in this case, the difference between the first and fourth wavelengths is small as described above, the first and second sets of discrete hue pixel values may be the same or almost the same depending on the combination of the first and second rays R1 and R4. In other words, there is almost no difference between the first and second sets of discrete hue pixel values. It is thus difficult for the processing unit 4 to distinguish the first and second ray directions based on the first captured image Img1.

In the second captured image Img2, the first pixel PX1 mainly receives the third ray R3 and also receives the second ray R2 substantially simultaneously with the third ray R3. The second pixel PX2 mainly receives the second ray R2 and also receives the third ray R3 substantially simultaneously with the second ray R2. As in the case of the first captured image Img1, the processing unit 4 calculates the first and second sets of discrete hue pixel values based on the second captured image Img2. Since, in this case, there is a relatively large difference between the second and third wavelengths as described above, the first and second sets of discrete hue pixel values are relatively widely different from each other. The processing unit 4 can thus distinguish the first and second ray directions based on the second captured image Img2.

As one example, in the first picked-up image Img1, a set of discrete hue pixel values of the first ray R1 received by the first pixel PX1 is (240, 60, 0), and a set of discrete hue pixel values of the fourth ray R4 received by the first pixel PX1 is (50, 200, 50). A set of discrete hue pixel values of the first ray R1 received by the second pixel PX2 is (200, 50, 0), and a set of discrete hue pixel values of the fourth ray R4 received by the second pixel PX2 is (60, 240, 60). In the second captured image Img2, a set of discrete hue pixel values of the third ray R3 received by the first pixel PX1 is (240, 60, 0), and a set of discrete hue pixel values of the second ray R2 received by the first pixel PX1 is (0, 50, 200). A set of discrete hue pixel values of the third ray R3 received by the second pixel. PX2 is (200, 50, 0), and a set of discrete hue pixel values of the second ray R2 received by the second pixel PX2 is (0, 60, 200).

In the above example, the upper limit value of the discrete hue pixel values is 255 in the decimal system. If, therefore, a set of discrete hue pixel values is calculated as described above, a first set of discrete hue pixel values in the first pixel PX1 is (255, 255, 50) and a second set of discrete hue pixel values in the second pixel PX2 is (255, 255, 60). Therefore, the difference between the first and second sets of discrete hue pixel values is small. In this case, it is difficult for the processing unit 4 to distinguish the ray directions of the first and second rays R1 and R4 based on the first captured image Img1. On the other hand, in the second captured image Img2, a first set of discrete hue pixel values in the first pixel PX1 is (240, 110, 200) and a second set of discrete hue pixel values in the second pixel PX2 is (200, 110, 240). Therefore, a difference between the first and second sets of discrete hue pixel values is relatively large. In this case, the processing unit 4 can distinguish the ray directions of the second and third rays R2 and R3 based on the second captured image Img2.

In the present modification, the processing unit 4 performs the same steps as steps S201 to S211 of the second embodiment shown in FIG. 7. In step S201, however, the processing unit 4 emits the fourth ray R4 in addition to the first ray R1. In step S203, the imaging unit 2 receives the first and fourth rays R1 and R4. In step S204, the processing unit 4 emits the third ray R3 in addition to the second ray R2. After the processing unit 4 performs step S204, it closes the shutter of the imaging unit 2 immediately before the second and third rays R2 and R3 enter the second pixel PX2 of the imaging unit 2. Accordingly, the processing unit 4 causes the imaging unit 2 to stop imaging (S205). In step S207, the imaging unit 2 receives the second and third rays R2 and R3. Since the ray directions of the second and third rays R2 and R3 are calculated as described above, the optical apparatus 1 can distinguish the ray directions of the second and third rays R2 and R3.

The present modification produces the following operations and advantages in addition to the same operations and advantages as those of the above-described embodiments and modifications. That is, in the present modification, the illumination unit 3 emits the third and fourth rays R3 and R4 to the surface 5 of the object, as described above, in addition to the first and second rays R1 and R2. If the shape or color distribution of the surface 5 of the object is unknown at the time of measurement, it is difficult to set the optimum combination of the wavelengths of the rays before the measurement. Even in such a case, the optical apparatus 1 of the present modification distinguished the directions of the rays by setting the first to fourth rays R1 to R4 as described above and using the first and second captured images Img1 and Img2. The shape of the surface 5 of the object is therefore calculated with higher reliability.

Second Modification to Third Embodiment

Figure 11:
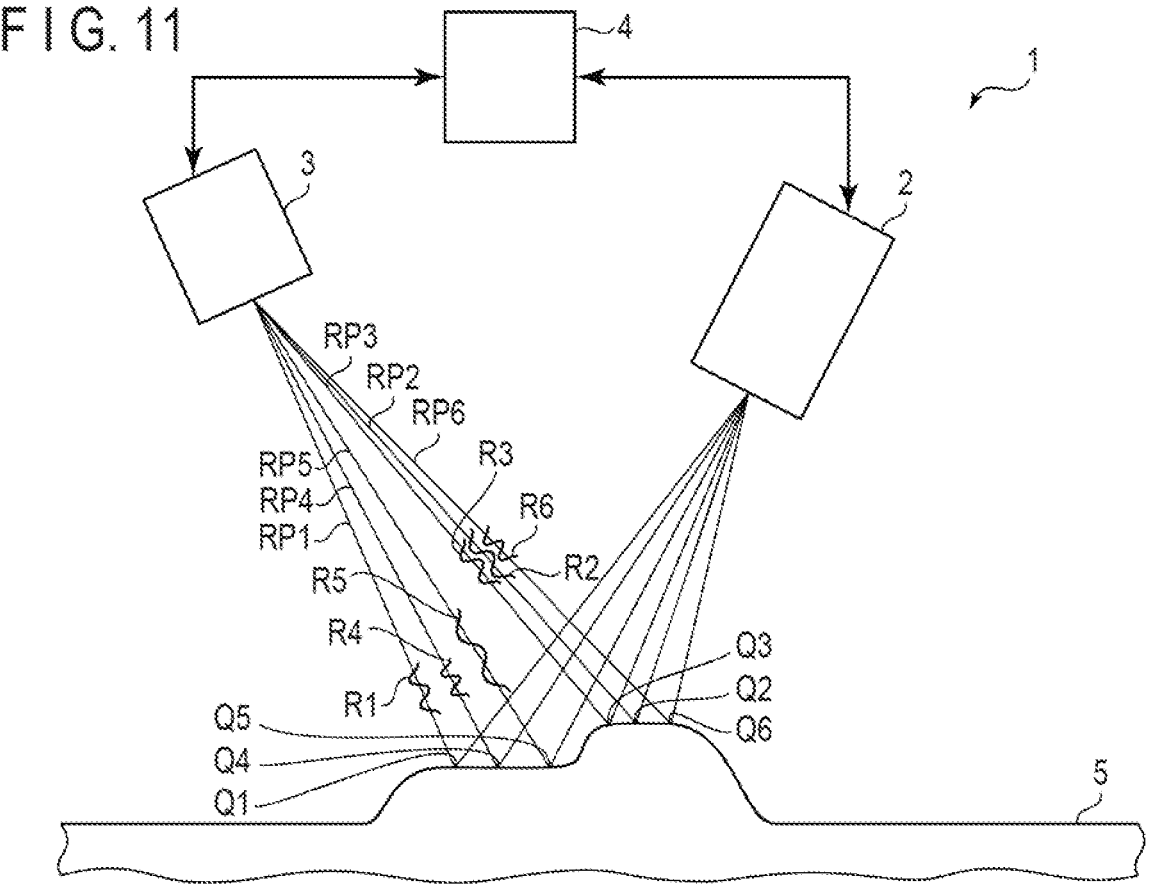
FIG. 11 is a schematic diagram showing an example of an optical apparatus according to a second modification to the third embodiment.

The optical apparatus 1 according to a second modification to the third embodiment is the same as the optical apparatus 1 according to the foregoing embodiments. As shown in FIG. 11, the present modification differs from the foregoing embodiments and modifications in that the illumination unit 3 emits fifth and sixth rays R5 and R6 in addition to the first to fourth rays R1 to R4. The first to sixth rays R1 to R6 are emitted from the illumination unit 3 along first to sixth ray paths RP1 to RP6, respectively. The first to sixth rays R1 to R6 are reflected by their respective first to sixth reflection regions Q1 to Q6. The fifth ray R5 and the sixth ray R6 have a fifth wavelength spectrum whose main component is a fifth wavelength and a sixth wavelength spectrum whose main component is a sixth wavelength, respectively. The first to sixth wavelength spectra are different from one another. As one example, the first wavelength is 450 nm (blue light), the second wavelength is 650 nm (red light), the third wavelength is 450 nm (blue light), the fourth wavelength is 550 nm (green light), the fifth wavelength is 650 nm (red light), and the sixth wavelength is 550 nm (green light). That is, the third wavelength is the same as the first wavelength, the fifth wavelength is the same as the second wavelength, and the sixth wavelength is the same as the fourth wavelength. Note that the first to sixth wavelengths are not limited to these values.

As shown in FIG. 11, the first to sixth rays R1 to R6 are emitted from the illumination unit 3 along the first to sixth ray paths RP1 to RP6, respectively. The time at which the first ray R1 is emitted from the illumination unit 3, the time at which the fourth ray R4 is emitted therefrom, and the time at which the fifth ray R5 is emitted therefrom are substantially the same. The time at which the second ray R2 is emitted from the illumination unit 3, the time at which the third ray R3 is emitted therefrom, and the time at which the sixth ray R6 is emitted therefrom are substantially the same. In other words, the fifth ray R5 is emitted from the illumination unit 3 substantially at the same time as the first and fourth rays R1 and R4. The sixth ray R6 is emitted from the illumination unit 3 substantially at the same time as the second and third rays R2 and R3.

In the present modification, the imaging unit 2 and the illumination unit 3 are controlled in the same manner as in the foregoing first modification. Unlike in the foregoing first modification, however, in the present modification, the first, fourth and fifth rays R1, R4 and R5 are emitted from the illumination unit 3 substantially at the same time and reflected by the first reflection region Q1, fourth reflection region Q4 and fifth reflection region Q5, respectively. Thus, the reflected ray of the first ray R1, that of the fourth ray R4 and that of the fifth ray R5 enter the first pixel PX1, the second pixel PX2 and the third pixel PX3, respectively. The imaging unit 2 acquires a first captured image Img1 through the first, fourth and fifth rays R1, R4 and R5. In addition, the second, third and sixth rays R2, R3 and R6 are emitted from the illumination unit 3 substantially at the same time and reflected by the second, third and sixth reflection regions Q2, Q3 and Q6, respectively. Thus, the reflected ray of the third ray R3, that of the second ray R2 and that of the sixth ray R6 enter the fourth pixel PX4, the fifth pixel PX5 and the sixth pixel PX6, respectively. The imaging unit 2 acquires a second captured image Img2 through the second, third and sixth rays R2, R3 and R6.

Figure 12:
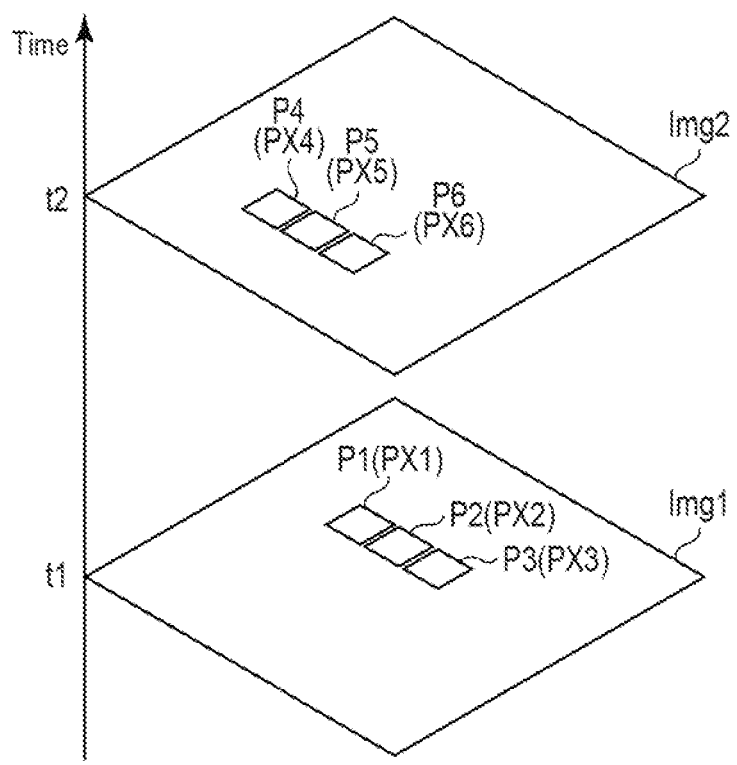
FIG. 12 is a schematic diagram showing an example of an image captured with time by an imaging unit in the optical apparatus according to the second modification to the third embodiment.

FIG. 12 is a schematic diagram showing in time series an example of first and second images Img1 and Img2 captured by the imaging unit 2 in the optical apparatus according to the present embodiment. In FIG. 12, the vertical axis indicates elapsed time of measurement by the optical apparatus 1. In the present modification, the first, fourth and fifth rays R1, R4 and R5 enter the imaging unit 2 substantially at the same time, and the third, second and sixth rays R3, R2 and R6 enter the imaging unit 2 substantially at the same time. In the example of FIG. 12, the first, fourth and fifth rays R1, R4 and R5 are received by the first, second and third pixels PX1, PX2 and PX3, respectively. In the first captured image Img1, the first, second and third regions P1, P2 and P3 correspond to the first, second and third pixels PX1, PX2 and PX3, respectively. The third, second and sixth rays R3, R2 and R6 are received by the fourth, fifth and sixth pixels PX4, PX5 and PX6, respectively. In the second captured image Img2, the fourth, fifth and sixth regions P4, P5 and P6 correspond to the fourth, fifth and sixth pixels PX4, PX5 and PX6, respectively.

In the present modification, the above-described representative discrete hue value is used for each of the pixels. The representative discrete hue value corresponds to the largest discrete hue pixel value of the discrete hue values in the pixels. In the first captured image Img1, the processing unit 4 calculates first to third discrete hue pixel values corresponding to the first to third pixels PX1 to PX3 as described above. Since the number of discrete hues is 3 in the present modification, the representative discrete hue value corresponding to each of the first to third pixels PX1 to PX3 is any one of 1, 2 and 3. In the second captured image Img2, the processing unit 4 calculates fourth to sixth discrete hue pixel values corresponding to the fourth to sixth pixels PX4 to PX6 as described above. Like in the first captured image Img1, in the second captured image Img2, the representative discrete hue value corresponding to each of the fourth to sixth pixels PX4 to PX6 is any one of 1, 2 and 3.

As one example, the first and third wavelengths are each 450 nm (blue light), the second and fifth wavelengths are each 650 nm (red light), and the fourth and sixth wavelengths are each 550 nm (green light). In RGB, discrete hue value 1 is caused to correspond to symbol B, discrete hue value 2 is caused to correspond to symbol G, and discrete hue value 3 is caused to correspond to symbol R. The first to sixth rays R1 to 6 are received by the first to sixth pixels PX1 to PX6, respectively as described above. Since, in this case, the first pixel receives the first ray R1, the first representative discrete hue value is 1. Since the second pixel receives the fourth ray R4, the second representative discrete hue value is 2. Since the third pixel receives the fifth ray R5, the third representative discrete hue value is three. Since the fourth pixel receives the third ray R3, the fourth representative discrete hue value is 1. Since the fifth pixel receives the second ray R2, the fifth representative discrete hue value is 3. Since the sixth pixel receives the sixth ray R6, the sixth representative discrete hue value is 2.

In the above case, the representative discrete hue values of the first to third pixels PX1 to X3 are clearer and more robust than the discrete hue pixel values of the first to third pixels PX1 to PX3. The reason is as follows. The discrete hue pixel values may greatly vary depending on the surface 5 of the object, while the change in the main wavelength of the rays is smaller than the change in the intensity of the rays depending on the surface 5 of the object. The processing unit 4 can distinguish the ray directions of the first, fourth and fifth rays R1, R4 and R5 based on the first captured image Img1 using the representative discrete hue values. The processing unit 4 can also distinguish the ray directions of the second, third and sixth rays R2, R3 and R6 based on the second captured image Img2.

In the present modification, the processing unit 4 performs the same steps as steps S201 to S211 of the second embodiment shown in FIG. 7. In step S201, however, the processing unit 4 emits the fourth and fifth rays R4 and R5 in addition to the first ray R1. In step S203, the imaging unit 2 receives the first, fourth and fifth rays R1, R4 and R5. In step S204, the processing unit 4 emits the third and sixth rays R3 and R6 in addition to the second ray R2. After the processing unit 4 performs step S204, it closes the shutter of the imaging unit 2 immediately before the second, third and sixth rays R2, R3 and R6 enter the second pixel PX2 of the imaging unit 2. Accordingly, the processing unit 4 causes the imaging unit 2 to stop imaging (S205). In step S207, the imaging unit 2 receives the second, third and sixth rays R2, R3 and R6. In step S210, the processing unit 4 calculates a representative discrete hue value in addition to a set of discrete hue pixel values. Since the ray directions of the first to sixth rays R1 to R6 are calculated as described above, the optical apparatus 1 can distinguish the ray directions of the first to sixth rays R1 to R6.

The present modification produces the following operations and advantages in addition to the same operations and advantages as those of the above-described embodiments and modifications. In the present modification, as described above, the ray directions of the first to sixth rays R1 to R6 can be distinguished based on the first and second captured images Img1 and Img2. In the present modification, therefore, it is possible to distinguish the ray directions the number of which is larger than the number of discrete hues. The processing unit 4 also distinguish the ray directions of the first to sixth rays R1 to R6 based on the representative discrete hue values of the first to sixth rays R1 to R6. The optical apparatus 1 can thus distinguish the ray directions without being affected by a minute measurement error or the like of the discrete hue pixel values. The shape of the surface 5 of the object is calculated with higher reliability.

Fourth Embodiment

Figure 13:
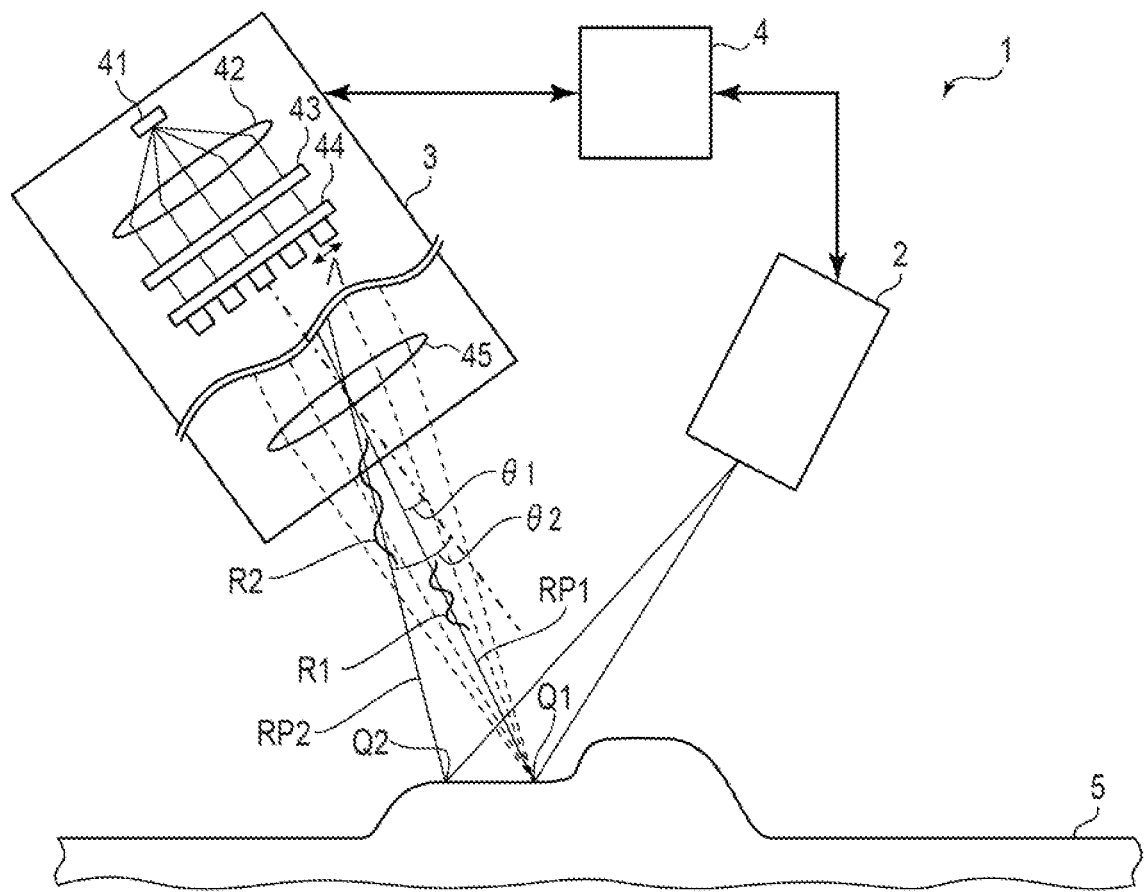
FIG. 13 is a schematic diagram showing an example of an optical apparatus according to a fourth embodiment.

As shown in FIG. 13, the optical apparatus 1 according to a fourth embodiment is the same as the optical apparatus 1 according to each of the foregoing embodiments and modifications. In the optical apparatus 1 according to the fourth embodiment, the illumination unit 3 includes an initial light source 41, an initial lens 42, a wavelength variable filter 43, a diffractive optical element 44 and an imaging lens 45. The initial light source 41 is capable of emitting a white ray having at least a first wavelength and a second wavelength. The initial light source 41 is, for example, a white LED. As one example, the first wavelength is 450 nm and the second wavelength is 650 nm. The initial lens 42 converts a ray emitted from the initial light source 41 into parallel light rays. The wavelength variable filter 43 selects a specific wavelength spectrum from the rays incident on the wavelength variable filter 43.

In the fourth embodiment, the wavelength variable filter 43 selects a ray having a specific wavelength spectrum from the rays emitted from the initial light source 41 and converted into parallel rays by the initial lens 42. The wavelength variable filter 43 can change the selected wavelength over time through an electrical operation. That is, the wavelength variable filter 43 does not change any wavelength with time by mechanical driving (e.g., galvanomirror). For example, the wavelength variable filter 43 is a liquid crystal tunable filter. As the liquid crystal tunable filter, there is Kurios-VBI manufactured by Thorlabs. Note that the wavelength variable filter 43 is not limited to the Kurios-VBI.

The diffractive optical element 44 diffracts the rays and changes the traveling directions of the rays. The diffractive optical element 44 may be of a transmission type or a reflection type. In the fourth embodiment, the diffractive optical element 44 is of a transmission type and has a periodic grating configuration with pitch Λ. In the illumination unit 3, the imaging lens 45 is disposed with its optical axis coincident or substantially coincident with the normal direction of the diffractive optical element 44. Note that the diffractive optical element 44 is not limited to this configuration.

In the fourth embodiment, as described above, a ray group emitted from the initial light source 41 is converted into parallel rays by the initial lens 42 and then converted into parallel rays whose main component is a specific wavelength by the wavelength variable filter 43. Assume here that the specific wavelength is Λ. The parallel rays are diffracted by the diffractive optical element 44 and reach the surface 5 of the object through the imaging lens 45. The diffraction angle θ in the diffractive optical element 44 is an angle formed by the ray direction and the optical axis of the imaging lens 45, namely, the normal direction of the diffractive optical element 44. The diffraction angle θ and the wavelength Λ satisfy the following equation:

$$\sin \theta = \pm m\lambda/\Lambda \quad (1)$$

where m is an integer.

As one example, when Λ is 10 µm and m is 1, it is seen from the equation (1) that the longer the wavelength, the greater the diffraction angle in the wavelength range of 1 µm or shorter. In the fourth embodiment, as described above, the second wavelength is longer than the first wavelength. The diffraction angle θ2 of the second ray R2 with the second wavelength is larger than the diffraction angle θ1 of the first ray R1 with the first wavelength. As described above, the rays transmitted through the wavelength variable filter 43 changes over time by selecting a wavelength of the wavelength variable filter 43 over time. Therefore, for example, as the selected wavelength of the wavelength variable filter 43 increases over time, the wavelength of a ray transmitted through the wavelength variable filter 43 increases over time. The diffraction angle θ thus increases over time.

In the optical apparatus 1 of the fourth embodiment, the processing unit 4 sets a first wavelength as the selected wavelength of the wavelength variable filter 43. The white ray emitted from the initial light source 41 is converted by the wavelength variable filter 43 into a first ray R1 that is parallel rays having the first wavelength as a main component. The first ray R1 is emitted by the diffractive optical element 44 along the first optical path RP1. As in the foregoing embodiments and modifications, the first ray R1 is reflected by the first reflection region Q1 of the surface 5 of the object. As in the foregoing embodiments and modifications, the processing unit 4 opens and closes the shutter 23 of the imaging unit 2 to cause the imaging unit 2 to receive the first ray R1. The processing unit 4 sets the selected wavelength of the wavelength variable filter 43 to a second wavelength. The white ray emitted from the initial light source is converted by the wavelength variable filter 43 into a second ray R2 that is parallel rays having the second wavelength as a main component. The second ray R2 is emitted along the second ray path RP2 by the diffractive optical element 44. As in the foregoing embodiments and the modifications, the second ray R2 is reflected by the second reflection region Q2 of the surface 5 of the object. As in the foregoing embodiments and the modifications, the processing unit 4 opens and closes the shutter 23 of the imaging unit 2 to cause the imaging unit 2 to receive the second ray R2.

In the fourth embodiment, the processing unit 4 may control the shutter of the imaging unit 2 by any of the methods of the foregoing embodiments and modifications. Specifically, the processing unit 4 may open the shutter 23 before the first ray R1 enters the imaging unit 2 and close the shutter 23 after the second ray R2 enters the imaging unit 2. In addition, the processing unit 4 may open the shutter 23 before the first ray R1 enters the imaging unit 2, open and close the shutter 23 immediately after the first ray R1 enters the imaging unit 2 and immediately after the second ray R2 enters the imaging unit 2, and close the shutter 23 after the second ray R2 enters the imaging unit 2. The processing unit 4 may also open the shutter 23 before the first ray R1 enters the imaging unit 2, open and close the shutter 23 immediately after the first ray R1 enters the imaging unit 2 and immediately before the second ray R2 enters the imaging unit 2, and close the shutter 23 after the second ray R2 enters the imaging unit 2. The processing unit 4 controls the imaging unit 2 appropriately by, for example, a combination of the first and second rays R1 and R2.

As described above, the imaging unit 2 acquires a captured image based on the first ray R1 and/or the second ray R2. Based on the captured image, the processing part 4 calculates a first set of discrete hue pixel values and a second set of discrete hue pixel values. The processing part 4 distinguishes the ray directions of the first and second rays R1 and R2 based on the difference between the first and second sets of discrete hue pixel values. The processing unit 4 may calculate a first representative discrete hue value from the first set of discrete hue pixel values and calculate a second representative discrete hue value from the second set of discrete hue pixel values. In this case, the processing unit 4 distinguishes the ray directions of the first and second rays R1 and R2 based on the first and second representative discrete hue values.

The fourth embodiment produces the following operations and advantages in addition to the same operations and advantages as those of the foregoing embodiments and modifications. In the fourth embodiment, the illumination unit 3 includes a wavelength variable filter 43 and a diffractive optical element 44. In the illumination unit 3, a white ray emitted from the initial light source 41 is transmitted through the wavelength variable filter 43 and thus a ray having a specific wavelength spectrum is selectively transmitted therethrough. The wavelength variable filter 43 changes a wavelength to be selected, over time to change the diffraction angle θ of the ray according to the diffraction optical element 44. The optical apparatus 1 of the fourth embodiment can thus emit a ray to a measurement portion of the surface 5 of the object.

In the fourth embodiment, the wavelength variable filter 43 also changes a wavelength to be selected, over time through electrical operation. Accordingly, a ray direction is selected at high speed. Since rays having different wavelength spectra are quickly emitted to the surface 5 of the object, the optical apparatus 1 distinguish the ray directions more quickly. The shape of the surface 5 of the object can be calculated more quickly and easily. Since, furthermore, the wavelength variable filter 43 changes a wavelength to be selected through electric operation, the optical apparatus 1 can stably measure the surface 5 of the object even though the optical apparatus 1 vibrates, for example. In the fourth embodiment, the number of discrete hues may be one. In this case, the imaging unit 2 may be, for example, a monochrome camera.

Modification to Fourth Embodiment

Figure 14:
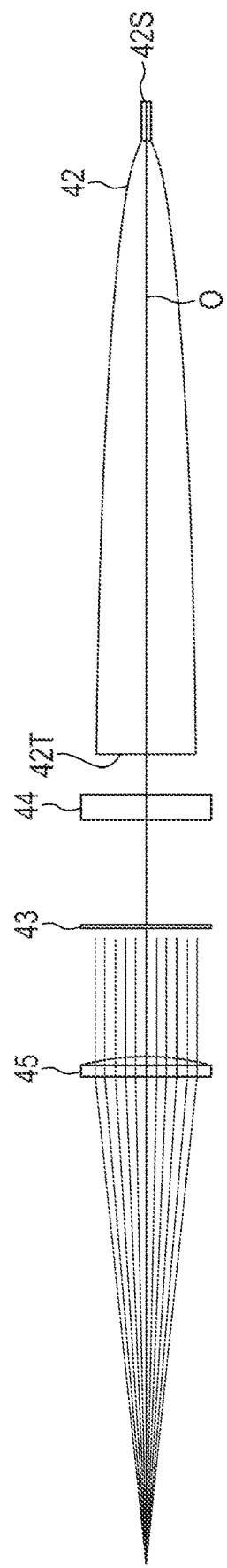
FIG. 14 is a schematic diagram showing an example of an optical apparatus according to a modification to the fourth embodiment.
Figure 15:
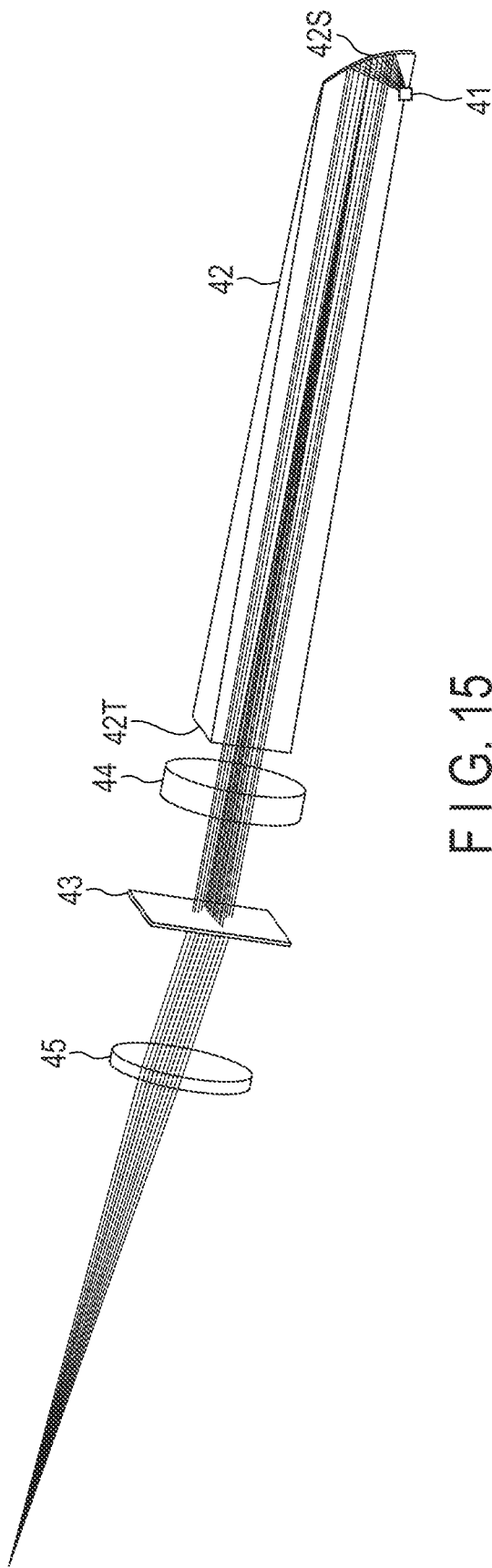
FIG. 15 is a schematic diagram showing an example of the optical apparatus according to the modification to the fourth embodiment when viewed from a direction other than that in FIG. 14.

As shown in FIG. 14, in the present modification, the initial lens 42, diffractive optical element 44, wavelength variable filter 43 and imaging lens 45 are arranged in this order along an optical axis O. The initial light source 41 is placed at the focal point of the initial lens 42. The optical axis O passes through the center of each of optical elements. As shown in FIGS. 14 and 15, in the present modification, the initial lens 42 is a light guide. The light guide is formed of acrylic, polycarbonate, glass, quartz or the like. The light guide is, for example, a compound parabolic concentrator (CPC). The initial lens 42 has a ray emitting surface 42T alongside the diffractive optical element 44 is located. The initial lens 42 has a reflecting surface 42S on the opposite side of the ray emitting surface 42T. In the present modification, the reflecting surface 42S is a paraboloid. A pair of sides extending along the optical axis O of the initial lens 42 is formed such that light the rays transmitted through the initial lens 42 are totally reflected. The sides of the initial lens 42 are formed to cause internal total reflection. As one example, the sides of the initial lens 42 are mirror-polished.

In the present modification, a group of rays emitted from the initial light source 41 is reflected by the reflecting surface 42S of the initial lens 42. When the group of rays emitted from the initial light source 41 is a divergent ray, the rays reflected by the reflecting surface 42S are converted into parallel rays in the direction along the optical axis O. However, the reflected rays are not converted into parallel rays in the direction intersecting the optical axis O. The reflected rays are guided through the initial lens 42 and reaches the emitting surface 42T in the above-described state. When the reflected rays are emitted from the emitting surface 42T, they are converted into parallel rays even in the direction intersecting the optical axis O. Thus, the rays emitted from the initial light source 41 are converted into parallel rays.

The present modification produces the following operations and advantages in addition to those of the foregoing embodiments and modifications. In the present modification, with the configuration described above, substantially all of the rays from the initial light source 41 enter the initial lens 42. The initial lens 42 converts the rays into parallel rays. Therefore, conversion of rays from the initial light source 41 into parallel rays is improved in efficiency.

Note that the technologies of the foregoing embodiments and modifications are combined as appropriate. As one example, the technology of the fourth embodiment is combined with those of the first to third embodiments and the modifications. As another example, the technology of the modification to the fourth embodiment is combined with those of the first to third embodiments and modifications.

In the optical apparatus 1 according to at least one of the foregoing embodiments, the first and second pixels of the imaging unit receive first and second rays emitted to an object from the illumination unit. The imaging unit captures an image based on the received rays, and the processing unit calculates first and second ray directions of the first and second rays based on the image captured by the imaging unit. The optical apparatus 1 can thus distinguish the ray directions of a plurality of rays.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An optical apparatus comprising:
    an illumination unit which is configured to emit a first ray having a first wavelength and a second ray having a second wavelength different from the first wavelength to an object;
    an imaging unit including a first pixel which is configured to receive the first ray emitted to the object and a second pixel which is configured to receive the second ray emitted to the object, the imaging unit being configured to capture an image based on the first ray received by the first pixel and the second ray received by the second pixel; and
    a processor which is configured to calculate a first ray direction of the first ray and a second ray direction of the second ray based on the image captured by the imaging unit,
    wherein the processor is configured to:
        cause the imaging unit to capture a first image based on the first ray received by the first pixel; and
        causes the imaging unit to capture a second image based on the second ray received by the second pixel.

2. The optical apparatus of claim 1, wherein the illumination unit is configured to emit the first ray and the second ray to the object with the first ray and the second ray received in the imaging unit configured to be shifted from each other.

3. The optical apparatus of claim 1, wherein the illumination unit is configured to emit a third ray having a third wavelength different from the first wavelength in the second ray direction substantially simultaneously with the first ray.

4. The optical apparatus of claim 1, wherein:
    the illumination unit includes a wavelength variable filter which is configured to change a selected wavelength through an electrical operation and a diffractive optical element which is configured to diffracts the first ray and the second ray emitted from the illumination unit; and the illumination unit is configured to diffract the first ray having the first wavelength set as the selected wavelength by the diffractive optical element configured to emit the diffracted first ray in the first ray direction, and is configured to diffract the second ray having the second wavelength set as the selected wavelength by the diffractive optical element configured to emit the diffracted second ray in the second ray direction.

5. The optical apparatus of claim 1, wherein the illumination unit includes:

a light source which is configured to emit a white ray; and a light guide having a reflecting surface that is configured to reflect the white ray emitted from the light source configured to emit the white ray as parallel rays.

6. An optical apparatus comprising:

an illumination unit which is configured to emit a first ray having a first wavelength and a second ray having a second wavelength different from the first wavelength to an object;

an imaging unit including a first pixel which is configured to receive the first ray emitted to the object and a second pixel which is configured to receive the second ray emitted to the object, the imaging unit being configured to capture an image based on the first ray received by the first pixel and the second ray received by the second pixel; and a processor which is configured to calculate a first ray direction of the first ray and a second ray direction of the second ray based on the image captured by the imaging unit, wherein the processor is configured to:

calculate a first set of discrete hue pixel values including a discrete hue pixel value for the first ray based on a first region corresponding to the first pixel in the captured image;

calculate a second set of discrete hue pixel values including a discrete hue pixel value for the second ray based on a second region corresponding to the second pixel in the captured image; and calculate the first ray direction and the second ray direction based on both the first set of discrete hue pixel values and the second set of discrete hue pixel values.

7. The optical apparatus of claim 6, wherein the processor is configured to set the discrete hue pixel value to 0 when the discrete hue pixel value is smaller than a threshold value of the discrete hue pixel value.

8. The optical apparatus of claim 6, wherein the processor is configured to:

calculate a first representative discrete hue value that is a discrete hue value corresponding to a largest one of the first set of discrete hue pixel values;

calculate a second representative discrete hue value that is a discrete hue value corresponding to a largest one of the second set of discrete hue pixel values; and calculate the first ray direction and the second ray direction based on both the first representative discrete hue value and the second representative discrete hue value.

9. The optical apparatus of claim 6, wherein the illumination unit configured to emit the first ray and the second ray to the object with the first ray and the second ray received in the imaging unit configured to be shifted from each other.

10. The optical apparatus of claim 6, wherein the illumination unit configured to emit a third ray having a third wavelength different from the first wavelength in the second ray direction substantially simultaneously with the first ray.

11. The optical apparatus of claim 6, wherein:

the illumination unit includes a wavelength variable filter which is configured to change a selected wavelength through an electrical operation and a diffractive optical element which is configured to diffract the first ray and the second ray emitted from the illumination unit; and the illumination unit configured to diffract the first ray having the first wavelength set as the selected wavelength by the diffractive optical element configured to emit the diffracted first ray in the first ray direction, and configured to diffract the second ray having the second wavelength set as the selected wavelength by the diffractive optical element configured to emit the diffracted second ray in the second ray direction.

12. The optical apparatus of claim 6, wherein the illumination unit includes:

a light source which is configured to emit a white ray; and a light guide having a reflecting surface that is configured to reflect the white ray emitted from the light source configured to emit the white ray as parallel rays.

13. Ray direction calculation method comprising:

emitting a first ray having a first wavelength to an object;

capturing a first image based on the first ray received by the first pixel;

emitting a second ray having a second wavelength different from the first wavelength to the object;

capturing a second image based on the second ray received by the second pixel; and calculating a first ray direction of the first ray and a second ray direction of the second ray based on the first image and the second image.

14. Ray direction calculation method comprising:

emitting a first ray having a first wavelength to an object;

receiving the first ray emitted to the object at a first pixel;

emitting a second ray having a second wavelength different from the first wavelength to the object;

receiving the second ray emitted to the object at a second pixel;

capturing an image based on the first ray received by the first pixel and the second ray received by the second pixel;

calculating a first set of discrete hue pixel values including a discrete hue pixel value for the first ray based on a first region corresponding to the first pixel in the captured image;

calculating a second set of discrete hue pixel values including a discrete hue pixel value for the second ray based on a second region corresponding to the second pixel in the captured image; and calculating the first ray direction and the second ray direction based on both the first set of discrete hue pixel values and the second set of discrete hue pixel values.

* * * * *